United States Patent
Hashimoto et al.

(10) Patent No.: US 10,767,576 B2
(45) Date of Patent: Sep. 8, 2020

(54) CONTROL DEVICE FOR CYLINDER DIRECT INJECTION TYPE OF INTERNAL COMBUSTION ENGINE

(71) Applicant: TOYOTA JIDOSHA KABUSHIKI KAISHA, Toyota-shi, Aichi-ken (JP)

(72) Inventors: Susumu Hashimoto, Susono (JP); Motonari Yarino, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 430 days.

(21) Appl. No.: 15/309,652

(22) PCT Filed: Jul. 7, 2015

(86) PCT No.: PCT/JP2015/069977
§ 371 (c)(1),
(2) Date: Nov. 8, 2016

(87) PCT Pub. No.: WO2016/009973
PCT Pub. Date: Jan. 21, 2016

(65) Prior Publication Data
US 2017/0248086 A1    Aug. 31, 2017

(30) Foreign Application Priority Data
Jul. 14, 2014 (JP) .................... 2014-144109

(51) Int. Cl.
*B60T 7/12* (2006.01)
*F02D 37/02* (2006.01)
*F02D 41/40* (2006.01)
*F02B 17/00* (2006.01)
(Continued)

(52) U.S. Cl.
CPC ........... *F02D 37/02* (2013.01); *F02B 17/005* (2013.01); *F02D 41/401* (2013.01); *F02P 5/145* (2013.01);
(Continued)

(58) Field of Classification Search
CPC .. F02D 37/02; F02D 41/401; F02D 2041/389; F02B 17/005; F02P 5/145; Y02T 10/12; Y02T 10/44
(Continued)

(56) References Cited

U.S. PATENT DOCUMENTS 4,503,830 A * 3/1985 Nakamura ............ F02D 35/022
123/501
5,462,032 A * 10/1995 Nakamura ............ F02D 41/401
123/357

(Continued)

FOREIGN PATENT DOCUMENTS

DE    11 2012 003 878 T5    7/2014
EP        1 647 690 A1        4/2006
(Continued)

OTHER PUBLICATIONS

International Search Report for PCT/JP2015/069977 dated Oct. 23, 2015 [PCT/ISA/210].
(Continued)

*Primary Examiner* — Hung Q Nguyen
*Assistant Examiner* — Anthony Donald Taylor, Jr.
(74) *Attorney, Agent, or Firm* — Sughrue Mion, PLLC

(57) ABSTRACT

The invention relates to a control device applied to a cylinder injection type of the engine (10). The control device carries out a fuel injection while changing a penetration force of the injected fuel by changing a maximum value of a lift amount of the valve body (22) of the injector (20). Further, the control device controls an ignition timing on the basis of the engine operation state. The control device changes an end timing of a preceding injection carried out immediately before the ignition timing such that a time period between the end timing of the preceding injection and the ignition timing under a state where a first value is set as
(Continued)

the maximum value of the valve body lift amount in the preceding injection, is longer than a time period between the end timing of the preceding injection and the ignition timing under a state that a second value larger than the first value is set as the maximum value of the valve body lift amount in the preceding injection.

17 Claims, 19 Drawing Sheets

(51) Int. Cl.
  *F02P 5/145* (2006.01)
  *F02D 41/38* (2006.01)
(52) U.S. Cl.
  CPC ......... *F02D 2041/389* (2013.01); *Y02T 10/12* (2013.01); *Y02T 10/44* (2013.01)
(58) Field of Classification Search
  USPC .......................... 123/298, 105; 701/298, 105
  See application file for complete search history.

(56) References Cited

U.S. PATENT DOCUMENTS

| | | | | |
|---|---|---|---|---|
| 8,655,572 B2* | 2/2014 | Iwai | ................... | F02D 41/0057 123/295 |
| 9,957,904 B2* | 5/2018 | Saito | ........................ | F02D 37/00 |
| 2007/0023006 A1* | 2/2007 | Takeda | .................... | F02D 37/02 123/305 |
| 2007/0079797 A1* | 4/2007 | Kihara | .................. | F02B 23/104 123/298 |
| 2010/0288236 A1* | 11/2010 | Ashizawa | ............... | F02B 23/10 123/478 |
| 2011/0155105 A1* | 6/2011 | Sukegawa | ............... | F02D 41/20 123/478 |
| 2012/0111302 A1* | 5/2012 | Shishime | .............. | F02D 41/405 123/299 |
| 2014/0299107 A1* | 10/2014 | Iwai | ...................... | F02D 41/006 123/478 |
| 2016/0195027 A1* | 7/2016 | Mori | ..................... | F02B 23/104 123/309 |

FOREIGN PATENT DOCUMENTS

| | | |
|---|---|---|
| JP | 2008-031930 A | 2/2008 |
| WO | 2015/033200 A1 | 3/2015 |

OTHER PUBLICATIONS

Written Opinion for PCT/JP2015/069977 dated Oct. 23, 2015 [PCT/ISA/237].

* cited by examiner

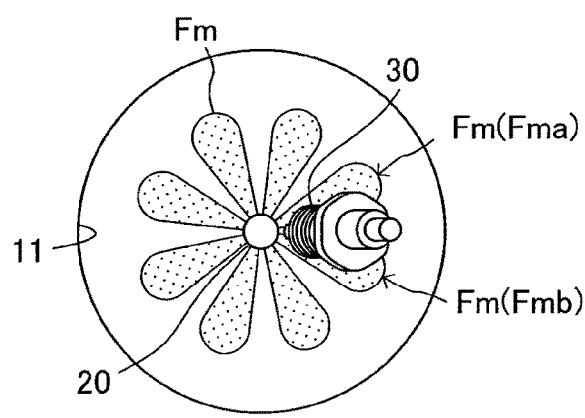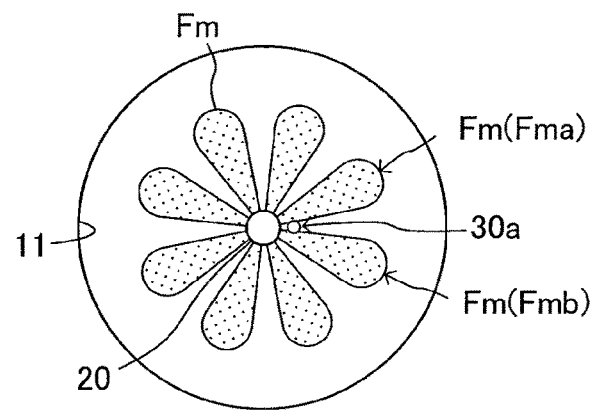
FIG. 2 (A)　　　　　　　FIG. 2 (B)

FIG. 5 (A) «COMPLETELY CLOSED»
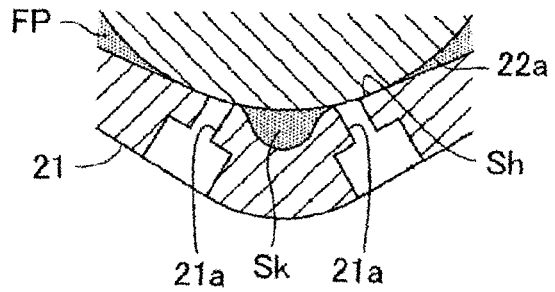
FIG. 5 (B) «PARTIAL LIFT»
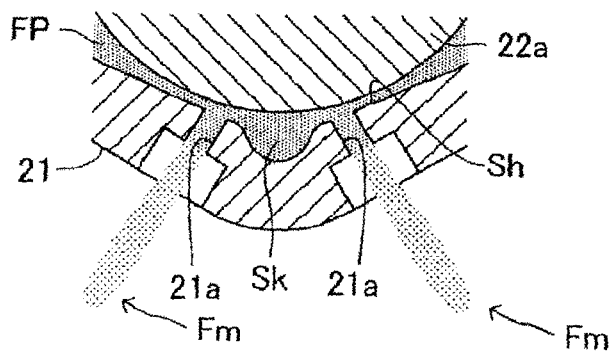
FIG. 5 (C) «FULL LIFT»
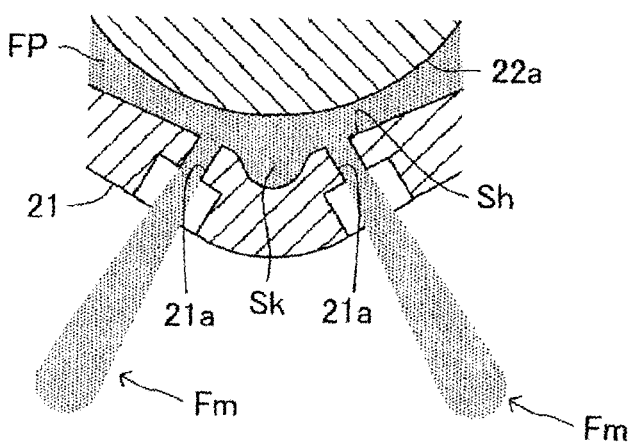

FIG.10
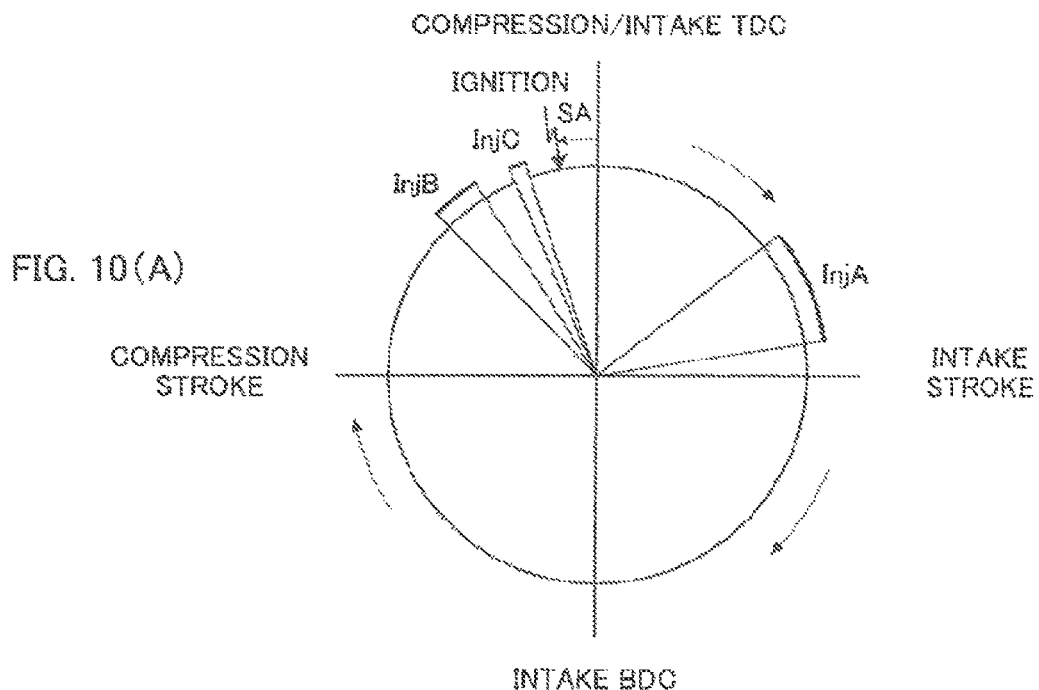
FIG. 10(A)
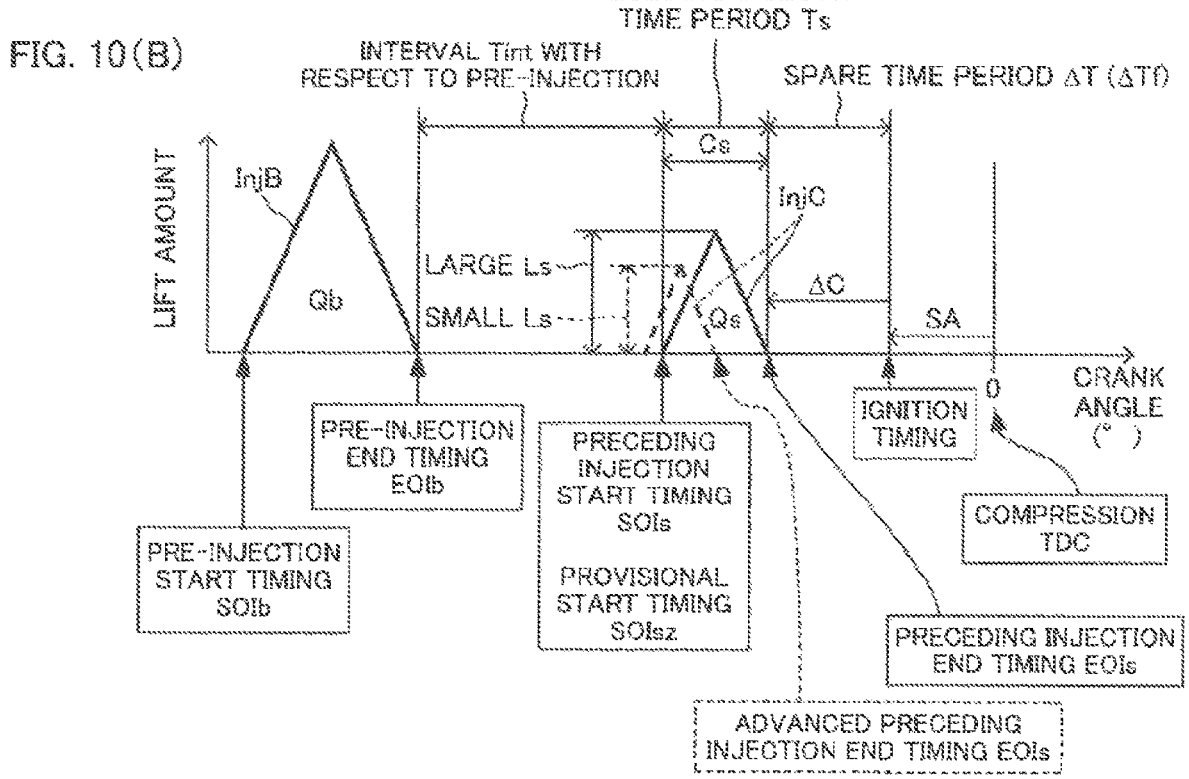
FIG. 10(B)

CONTROL DEVICE FOR CYLINDER DIRECT INJECTION TYPE OF INTERNAL COMBUSTION ENGINE

CROSS REFERENCE TO RELATED APPLICATIONS

This application is a National Stage of International Application No. PCT/JP2015/069977 filed Jul. 7, 2015, claiming priority based on Japanese Patent Application No. 2014-144109 filed Jul. 14, 2014, the contents of all of which are incorporated herein by reference in their entirety.

TECHNICAL FIELD

This invention relates to a control device for a cylinder direct injection type of an internal combustion engine provided with at least one injector (i.e. in-cylinder fuel injector) for injecting a fuel directly into a cylinder (i.e. a combustion chamber).

BACKGROUND ART

One of the well-known cylinder injection type of an internal combustion engine comprises fuel injectors each having injection holes and corresponding spark plugs each having a spark generation part (an electrode part) (for example, refer to the Patent Literature 1). Each of the injectors is provided such that each of the injection holes of the injector exposes to the interior of a combustion chamber of the engine. Each of the corresponding spark plug is provided such that the spark generation part of the plug is located adjacent to the injection holes of the injector. In this engine, each of the fuel injectors and each of the corresponding ignition plug are positioned such that the fuel injected from the fuel injector (actually, the spray of the fuel injected from the fuel injector) reaches the spark generation part of the spark plug directly. Thereby, the mixture gas having a high ignition property can be formed around the spark generation part and the spark generation part can ignite the mixture gas. As a result, the amount of the injected fuel can be reduced and thus, the fuel consumption can be improved. Such an engine is referred to as a spray-guided type of the engine because the fuel spray is introduced (guided) directly to the spark generation part by the fuel injection.

CITATION LIST

Patent Literature

[PTL. 1]
JP 2008-31930 A

SUMMARY OF INVENTION

In the spray-guided type of the engine, in order to realize the stable ignition and combustion of the fuel, the ignition should be carried out when the injected fuel passes an area adjacent to the spark generation part. However, the distance between the injection hole of the fuel injector and the spark generation part of the spark plug is short. Thus, the time period from the timing of the fuel injection to the timing of the fuel spray passing the area adjacent to the spark generation part to disperse is extremely short (hereinafter, the time period will be referred to as "the ignition permissible time period" for convenience). In particular, as shown in FIG. 2 of the Patent Literature 1, when the injection hole of the fuel injector and the spark generation part of the ignition plug are positioned at an upper central area in the combustion chamber, the ignition permissible time period becomes extremely short. Therefore, the ignition is carried out when the vaporization of the fuel does not progress and/or the amount of the air suctioned into the fuel spray is insufficient and as a result, the proportion of the fuel burning completely decreases to decrease the combustion efficient.

The invention has been made to solve the problem described above. That is, one of the objects of the invention is to provide a control device for an internal combustion engine which is applied to a spray-guided type of an internal combustion engine and can assuredly and stably carry out the ignition of the injected fuel, realize the combustion of the injected fuel and improve the combustion efficient (hereinafter, the control device according to the invention will be referred to as "the invention device").

The internal combustion engine (the cylinder injection type of the internal combustion engine), which the invention device is applied to, comprises an ignition plug having a spark generation part (an electrode part) and an injector (a fuel injector) having a movable valve body.

The injector injects the fuel from an injection hole of the injector directly into a cylinder of the engine by moving the valve body. Further, the injector is arranged/configured such that the spray including at least a part of the fuel injected from the injector reaches the spark generation part (or an area adjacent to the spark generation part) of the ignition plug directly.

Further, the invention device comprises a control part. The control part is configured to:

(1) execute the fuel injection by the injector while changing a penetration force of the injected fuel by changing a maximum value of a lift amount (a moving amount) of the valve body in the fuel injection; and (2) control an ignition timing for generating a spark from the spark generation part on the basis of the operation state of the engine.

As the maximum value of the lift amount of the valve body of the injector in the fuel injection (hereinafter, the maximum value may be referred to as "the injection lift amount maximum value") decreases, the pressure of the fuel reaching an inlet part of the injection hole of the interior of the injector lowers. Thus, as the injection lift amount maximum value decreases, the penetration force of the fuel injected from the outlet part of the injection hole into the cylinder weakens and as a result, the moving speed (the flying speed) of the injected fuel decreases. Therefore, as the penetration force weakens, the ignition permissible time period described above elongates. The penetration force of the injected fuel is changed in response to various requirements such as the amount of the fuel adhering to the cylinder wall face and the amount of the fuel to be injected. On the other hand, as a time period until the injected fuel is actually ignited elongates, the vaporization of the fuel progresses and the large amount of the air is suctioned into the fuel spray. Therefore, the proportion of the fuel burning completely increases and thus, the combustion efficient is improved.

Accordingly, the control part of the invention device is configured to control the time period between the injection end timing of the fuel injection carried out immediately before the ignition timing and the ignition timing as described below. Hereinafter, the fuel injection carried out immediately before the ignition timing will be referred to as "the preceding injection" and the time period between the injection end timing of the preceding injection and the ignition timing may be referred to as "the spare time period".

The control part is configured to change the injection end timing of the preceding injection such that the spare time period under a state where a first value is set as the maximum value of the lift amount in the preceding injection, is longer than the spare time period under a state where a second value larger than the first value is set as the maximum value of the lift amount in the preceding injection. For this end, the control part may be configured to change the ignition timing. However, preferably, the control part does not change the ignition timing in terms of the fuel consumption. Further, the control part may be configured to manage the time period between the injection end timing of the preceding injection and the ignition timing (the spare time period) by a crank angle (and the engine speed) when the control part changes the spare time period.

As described above, the invention device can set the time period between the fuel injection (the preceding injection) and the fuel ignition depending on the maximum value of the lift amount (therefore, depending on the penetration force of the injected fuel). Therefore, the invention device can carry out the ignition when the injected fuel exists at an area adjacent to the spark generation part of the ignition plug, independently of the maximum value of the lift amount in the preceding injection and thus, the invention device can ignite and burn the mixture gas assuredly. Further, the invention device can elongate the time period between the fuel injection (the preceding injection) and the fuel ignition depending on the maximum value of the lift amount. Therefore, the invention device can initiate the combustion of the fuel under a state where the vaporization of the fuel progresses and/or the large amount of the air is suctioned into the fuel spray. As a result, the invention device can improve the combustion efficient.

As the fuel pressure in the preceding injection (the pressure of the fuel supplied to the injector) lowers, the penetration force of the injected fuel weakens. Accordingly, the control device is configured to change the injection end timing of the preceding injection such that the time period between the injection end timing of the preceding injection and the ignition timing (the spare time period) elongates as the fuel pressure in the preceding injection lowers. Thereby, even when the fuel pressure changes, the stable ignition and combustion can be realized and the combustion efficient can be improved.

Further, the control part may be configured to execute a fuel injection by the injector as a pre-injection in addition to the preceding injection at a timing before the preceding injection. In this case, preferably, the influence of the pre-injection on the fuel (the fuel spray) injected by the preceding injection is considered.

For example, a gas flow is generated in the cylinder by the pre-injection. The gas flow may remain at the timing of carrying out the preceding injection. The gas flow generated in the cylinder by the pre-injection and remaining in the cylinder at the timing of carrying out the preceding injection may be simply referred to as "the residual gas flow". As the strength of the residual gas flow increases, the penetration force and/or the moving speed of the fuel injected by the preceding injection increase. Therefore, as the strength of the residual gas flow increases, the ignition permissible time period described above shortens and thus, it is desired to shorten the spare time period described above.

Accordingly, the control part may be configured to:
acquire a first parameter having a correlation with the strength of the residual gas flow; and change the injection end timing of the preceding injection depending on the acquired first parameter such that the time period between the injection end timing of the preceding injection and the ignition timing (the spare time period) shortens as the strength of the residual gas flow increases.

Thereby, even when the ignition permissible time period described above changes due to the gas flow in the cylinder generated by the pre-injection, the deterioration of the combustion change can be prevented and the combustion efficient can be improved.

In this case, the control part may be configured to acquire, as the first parameter, at least one of:
the time period between the injection end timing of the pre-injection and the injection start timing of the preceding injection;
the amount of the fuel injected by the pre-injection;
the fuel pressure in the pre-injection; and
the maximum value of the lift amount of the valve body in the pre-injection.

The relationship between each of the first parameters and the strength of the residual gal flow is as follows.

As the time period between the injection end timing of the pre-injection and the injection start timing of the preceding injection shortens, the strength of the residual gas flow increases.

As the amount of the fuel injected by the pre-injection increases, the strength of the residual gas flow increases.

As the fuel pressure in the pre-injection increases, the strength of the residual gas flow increases.

As the maximum value of the lift amount of the valve body in the pre-injection increases, the strength of the residual gas flow increases.

Alternatively, the control part may be configured to calculate the first parameter on the basis of at least two or more of:
the time period between the injection end timing of the pre-injection and the injection start timing of the preceding injection;
the amount of the fuel injected by the pre-injection; and
the fuel pressure in the pre-injection.

The injector according to one aspect of the invention device has a sac chamber (a fuel reservoir) in a tip end part of the injector, the sac chamber communicating with the injection hole under a state where at least the valve body is moved. In this case, as the strength of the fuel flow generated in the sac chamber increases, the disperse degree of the injected fuel increases and thus, the penetration force of the injected fuel weakens.

Accordingly, the control part is configured to acquire a second parameter having a correlation with the strength of the fuel flow remaining in the sac chamber at the timing of carrying out the preceding injection. Hereinafter, the fuel flow remaining in the sac chamber at the timing of carrying out the preceding injection will be referred to as "the sac chamber fuel flow".

Further, the control part is configured to change the injection end timing of the preceding injection depending on the acquired second parameter such that the time period between the injection end timing of the preceding injection and the ignition timing (the spare time period) elongates as the strength of the sac chamber fuel flow increases. Thereby, even when the penetration force of the fuel injected by the preceding injection changes due to the influence of the sac chamber fuel flow and thus, the ignition permissible time period described above changes, the deterioration of the combustion change can be prevented and the combustion efficient can be improved.

In this case, the control part may be configured to acquire, as the second parameter, at least one of:

the time period between the injection end timing of the pre-injection and the injection start timing of the preceding injection;

the amount of the fuel injected by the pre-injection;

the fuel pressure in the pre-injection;

the maximum value of the lift amount of the valve body in the pre-injection; and the change amount of the fuel pressure in the sac chamber acquired on the basis of the pressure in the sac chamber.

The relationship between each of the second parameters and the strength of the sac chamber fuel flow is as follows.

As the time period between the injection end timing of the pre-injection and the injection start timing of the preceding injection shortens, the strength of the sac chamber fuel flow increases.

As the amount of the fuel injected by the pre-injection increases, the strength of the sac chamber fuel flow increases.

As the fuel pressure in the pre-injection increases, the strength of the sac chamber fuel flow increases.

As the maximum value of the lift amount of the valve body in the pre-injection increases, the strength of the sac chamber fuel flow increases.

As the change amount of the fuel pressure in the sac chamber acquired on the basis of the pressure in the sac chamber increases, the strength of the sac chamber fuel flow increases.

Alternatively, the control part may be configured to calculate the second parameter on the basis of at least two or more of:

the time period between the injection end timing of the pre-injection and the injection start timing of the preceding injection;

the amount of the fuel injected by the pre-injection; and the fuel pressure in the pre-injection.

In addition, one aspect of the control part of the invention device may be configured to change the spare time period in consideration of the strength of the gas flow remaining in the cylinder at the timing of carrying out the preceding injection (the residual gas flow) and the strength of the fuel flow remaining in the sac chamber at the timing of carrying out the preceding injection (the sac chamber fuel flow). That is, the control part may be configured to shorten the spare time period as the strength of the residual gas flow increases and elongate the spare time period as the strength of the sac chamber fuel flow increases.

In this case, the control part may be configured to:

acquire at least one of the time period between the injection end timing of the pre-injection and the injection start timing of the preceding injection, the amount of the fuel injected by the pre-injection and the fuel pressure in the pre-injection as a common parameter for the first and second parameters;

acquire a correction amount for correcting the influence of the gas flow generated in the cylinder by the pre-injection and the fuel flow generated in the sac chamber by the pre-injection on the penetration force of the fuel injected by the preceding injection on the basis of the common parameter; and correct the time period between the injection end timing of the preceding injection and the ignition timing (the spare time period) by using the correction amount.

Thereby, the further appropriate spare time period can be set and thus, the deterioration of the combustion change can be prevented and the combustion efficient can be further improved.

The other objects, features and accompanying advantages of the invention can be easily understood from the description of the embodiment of the invention with reference to the drawings.

BRIEF DESCRIPTION OF DRAWINGS

FIGS. 2(A) and 2(B) are plan views of the cylinder showing a spray shape of an injected fuel in the cylinder (a combustion chamber) shown in FIG. 1, respectively.

FIGS. 5(A), 5(B), and 5(C) are partial sectional views, each showing a section of the injector shown in FIG. 1 along a plane including a central axis of the injector.

FIG. 10(A) is a view showing a timing of each fuel injection and FIG. 10(B) is a time chart showing a change of needle lift amounts in the preceding injection and precedent injection, respectively.

DESCRIPTION OF EMBODIMENT

Below, a control device for an internal combustion engine according to each of embodiments of the invention will be described with reference to the drawings. Hereinafter, the control device may be referred to as "the present control device".

First Embodiment

<Configuration>

Figure 1:
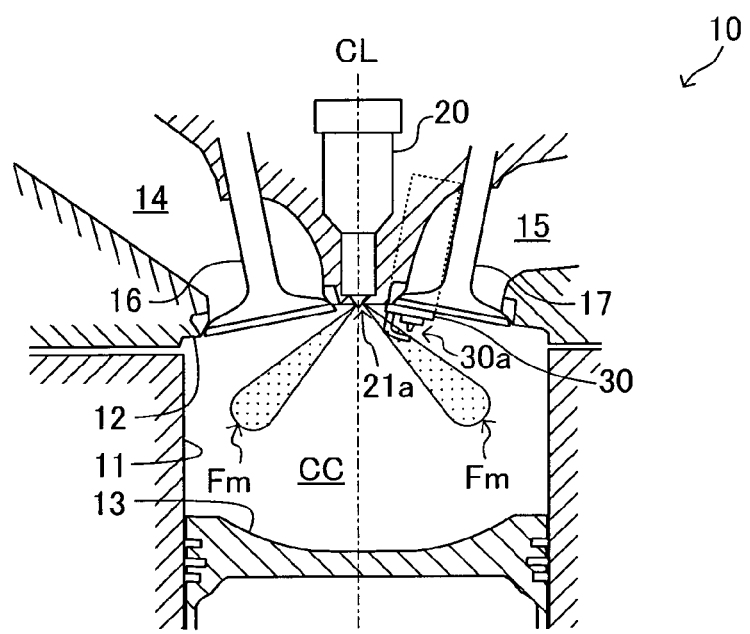
FIG. 1 is a partial schematic sectional view of one of cylinders of an internal combustion engine to which a control device (a first device) according to a first embodiment of the invention is applied.

The control device according to a first embodiment of the invention is applied to an internal combustion engine 10 shown in FIG. 1. Hereinafter, this control device will be referred to as "the first device". The engine 10 is a piston-reciprocating cylinder-injection (direct-injection) spark-ignition type of a multi-cylinder (in this embodiment, four-cylinder) gasoline engine. The engine 10 has combustion chambers (cylinders) CC.

Each of the combustion chamber CC is a generally cylindrical space defined by a cylinder bore wall face (a side wall face of the cylinder CC) 11, a cylinder head lower wall face (a combustion chamber upper wall face) 12, a piston top face 13 and intake and exhaust valves 16 and 17 described below.

Intake and exhaust ports 14 and 15 are formed in a cylinder head portion, respectively. The ports 14 and 15 communicates with the corresponding combustion chamber CC, respectively. The intake and exhaust valves 16 and 17 are provided in the cylinder head portion. The intake valve 16 is configured to be driven by a cam of an intake cam shaft not shown to open and close a connection part between the corresponding intake port 14 and the corresponding combustion chamber CC. The exhaust valve 17 is configured to be driven by a cam of an exhaust cam shaft not shown to open and close a connection part between the corresponding exhaust port 15 and the corresponding combustion chamber CC. Therefore, each of the combustion chamber CC is opened and closed by the corresponding intake and exhaust valves 16 and 17.

It should be noted that a pair of the intake ports 14 are formed for each of the combustion chambers CC. The connection part between the intake port 14 and the combustion chamber CC is opened and closed by the corresponding intake valve 16 of the pair. Similarly, a pair of the exhaust ports 15 are formed for each of the combustion chambers CC. The connection part between the exhaust port 15 and the combustion chamber CC is opened and closed by the corresponding exhaust valve 17 of the pair.

Further, the engine 10 has injectors (fuel injection valves, fuel injectors) 20 and spark plugs 30.

Each of the injectors 20 has injection holes 21a. The injection holes 21a of each of the injectors 20 expose to an interior of the corresponding combustion chamber CC at a lower wall face 12 of the cylinder head portion at a central area of the corresponding combustion chamber CC (at a position adjacent to an area through which a central axis CL of the corresponding cylinder bore extends).

Each of the spark plugs 30 is provided in the cylinder head portion at a position adjacent to the corresponding injector 20. As shown in FIGS. 1, 2(A) and 2(B), a spark generation part (an electrode part including central and ground electrodes) 30a of each of the spark plugs 30 exposes to the interior of the corresponding combustion chamber CC at the lower wall face 12 of the cylinder head portion at a position adjacent to the injection holes 21a of the corresponding injector 20.

Figure 3:
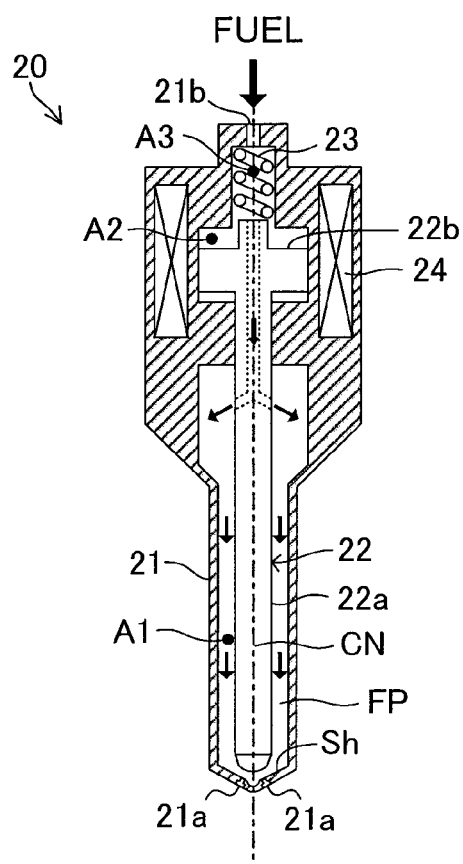
FIG. 3 is a schematic longitudinal sectional view of a fuel injection shown in FIG. 1.

As shown in FIG. 3, the injector 20 has a nozzle body part 21, a needle valve 22 which is a valve body, a coil spring 23 and a solenoid 24.

Figure 4:
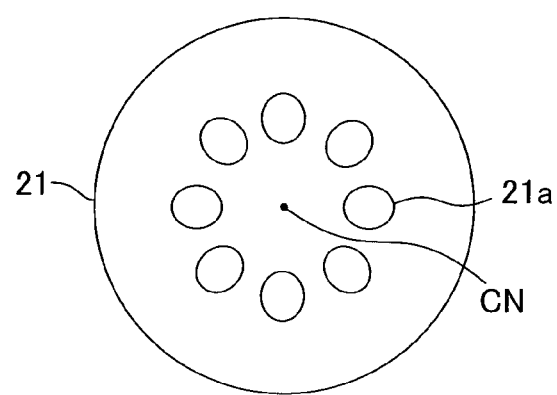
FIG. 4 is a front view of a tip end part of the fuel injector shown in FIG. 1.

Cylindrical spaces A1, A2 and A3 are formed in the nozzle body part 21. Each of the spaces A1 to A3 is formed coaxially with a central axis CN of the nozzle body part 21 and the spaces A1 to A3 communicate with each other. As shown in FIG. 4, a plurality of the injection holes (in this embodiment, eight injection holes) 21a are formed in a tip end part of the nozzle body part 21.

Each of the injection holes 21a is a communication hole which makes the cylindrical space A1 communicate with the exterior of the injector 20. As shown in FIGS. 5(A) to 5(C), a sac chamber Sk for reserving the fuel is formed at the tip end part of the nozzle body part 21 in an area enclosed by the injection holes 21a. The sac chamber Sk has a generally semispherical shape.

As shown in FIG. 4, the injection holes 21a are formed equiangularly along a circle about the central axis CN at the tip end part of the nozzle body part 21. Therefore, the spray Fm of the fuel injected through each of the holes 21a has a shape shown in FIGS. 1 and 2. The spark generation part 30a described above of the spark plug 30 is positioned such that the fuel spray Fm including at least a part of the fuel injected from the injection hole 21a can reach the spark generation part 30a directly. In particular, as shown in FIG. 2(B), the spark generation part 30a is positioned such that the spark generation part 30a locates between the fuel sprays Fma and Fmb formed of the fuel injected toward the spark generation part 30a and a part of the fuel sprays Fma and Fmb reaches the spark generation part 30a. As described above, the fuel is guided to the spark generation part 30a by the injection (the fuel spray) by the injector 20 and thus, the engine 10 may be referred to as "the spray guided type of the internal combustion engine".

Again, referring to FIG. 3, a fuel inlet hole 21b is formed at a proximal end part of the nozzle body part 21. The hole 21b makes the cylindrical space A3 communicate with a fuel delivery pipe (not shown).

The needle valve 22 has a cylinder part 22a and a jaw part 22b. The cylinder part 22a has a small radius and a circular cylinder shape. The jaw part 22b has a large radius and a circular cylinder shape. The cylinder part 22a has a generally semispherical shape at its tip end. The tip end side portion of the cylinder part 22a is housed in the cylindrical space A1. As a result, a fuel passage FP is formed around the tip end side portion of the cylinder part 22a of the needle valve 22. That is, the fuel passage FP is formed between the tip end side portion of the cylinder part 22a and the tip end side portion of the nozzle body part 21. The jaw part 22b is housed in the cylindrical space A2. The needle valve 22 is configured to move along the central axis (the needle valve axis) CN.

Further, a fuel passage is formed in the needle valve 22. This fuel passage makes the proximal end part of the needle valve 22 communicate with an outer peripheral wall face of the tip end side part of the cylinder part 22a. As a result, the fuel flowing from the fuel inlet hole 21b into the cylindrical space A3 is supplied to the fuel passage FP through this fuel passage formed in the needle valve 22.

The coil spring 23 is positioned in the cylindrical space A3. The spring 23 is configured to bias the needle valve 22 toward the injection holes 21a.

The solenoid 24 is positioned around the cylindrical space A2 at a position adjacent to the proximal end part of the nozzle body part 21. The solenoid 24 is energized by an injector actuation signal from an ECU 40 described below and then, generates a magnetic force for moving the needle valve 22 toward the fuel inlet hole 21b (toward the proximal end part) against the biasing force of the spring 23.

When the solenoid 24 is not energized, the tip end part of the needle valve 22 (the tip end of the cylinder part 22a) is pressed to a tip end part inner peripheral wall face (a seat part) Sh of the nozzle body part 21 by the spring 23. When the needle valve 22 is under this state, an amount of the movement of the needle valve 22 along the central axis CN is defined as zero. Hereinafter, the moving amount of the needle valve 22 in the direction of the central axis CN may be referred to as "the needle lift amount" or "the lift amount".

As shown in FIG. 5(A), when the needle lift amount is zero, the injection holes 21a are closed by the tip end part of the needle valve 22. As a result, no fuel is supplied from the fuel passage FP to the interior of the injection holes 21a and thus, no fuel is injected. Therefore, a portion of the seat part Sh around each of the injection holes 21a forms a valve seat for the needle valve 22.

When the solenoid 24 is energized and then, the needle valve 22 moves toward the proximal end part, the needle lift amount becomes larger than zero and then, the tip end part of the needle valve 22 moves away from the seat part Sh as shown in FIGS. 5(B) and 5(C). As a result, the injection holes 21a open and then, the fuel is injected through the injection holes 21a.

When the needle lift amount becomes a predetermined amount, the jaw part 22b shown in FIG. 3 abuts against a wall part defining the cylindrical spage A2 of the nozzle body part 21. As a result, the movement of the needle valve 22 is restricted. The needle lift amount at this time will be referred to as "the maximum lift amount" or "the full lift amount". That is, the needle lift amount can change between zero and the maximum lift amount.

The fuel injection under a state where the maximum value of the needle lift amount in the fuel injection reaches the maximum lift amount as shown in FIG. 5(C) may be referred to as "the full lift injection". On the other hand, the fuel injection under a state where the maximum value of the needle lift amount in the fuel injection is smaller than the maximum lift amount as shown in FIG. 5(B) may be referred to as "the partial lift injection". Hereinafter, a lift amount between zero and the maximum lift amount may be also referred to as "the partial lift amount".

The needle lift amount can be controlled by changing a time period for energizing the solenoid 24. In other words, the start and end timings of the fuel injection and the maximum value of the needle lift amount in the fuel injection can be controlled on the basis of the timing of energizing the solenoid 24.

Figure 6:
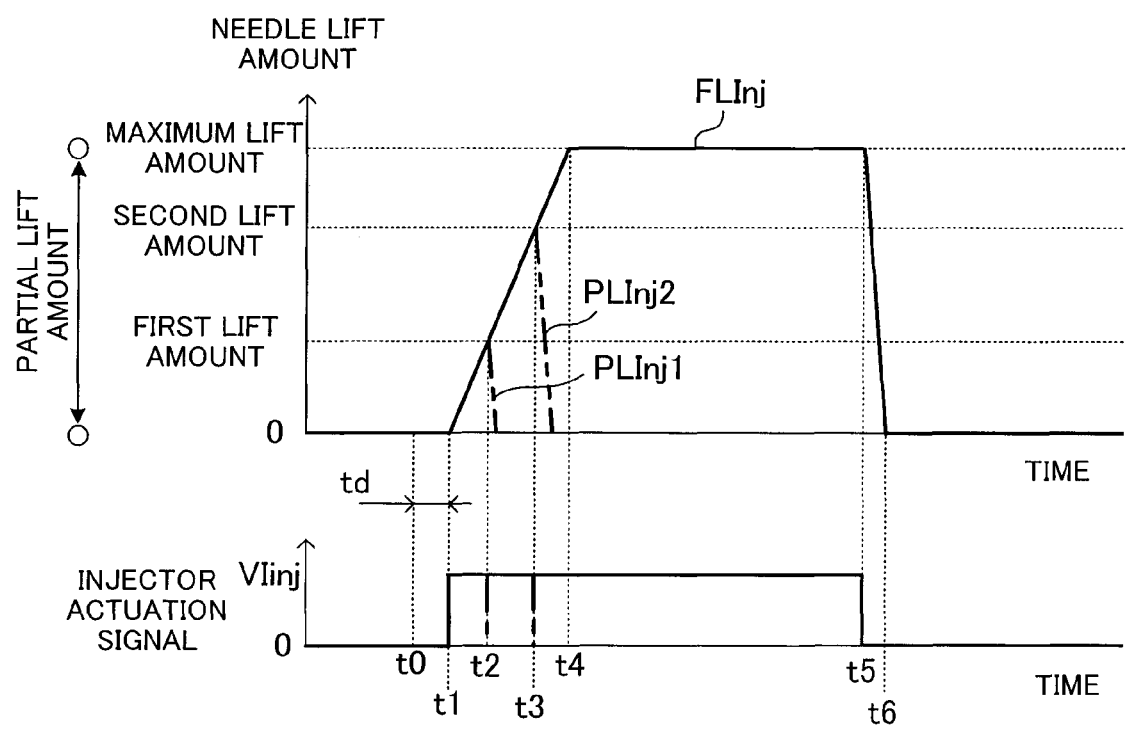
FIG. 6 is a time chart showing a lift amount of a valve body (a needle valve) of the injector shown in FIG. 1 and an injector actuation signal.

For example, the partial lift injection under a state where a first lift amount shown in FIG. 6 is set as the maximum value of the needle lift amount in the fuel injection, is carried out as described below. That is, when the injector actuation signal is changed from zero to a predetermined voltage VInj at the timing t1, the valve body 22 starts to move. Then, the lift amount of the valve body 22 reaches the first lift amount smaller than the maximum lift amount at the timing t2. At the timing t2, the injector actuation signal is changed from the predetermined voltage VInj to zero. As a result, the needle lift amount decreases from the first lift amount and reaches zero immediately after the timing t2 as indicated by a dashed line PLInj1. The fuel is injected between the timing t1 and the time immediately after the timing t2. In this case, the amount of the injected fuel corresponds to a value correlating with an area of a portion (a triangle portion) enclosed by a wave line of the needle lift amount shown in FIG. 6. Actually, the valve body 22 starts to move at a timing when an ineffective injection time period td elapses after a timing of the change of the injector actuation signal from zero to the predetermined voltage VInj. However, the ineffective injection time period td is extremely short and thus, the time period td will be omitted in the following description.

Similarly, when the injector actuation signal is changed to the predetermined voltage VInj at the timing t1 and then, is changed to zero at the timing t3 after the timing t2, the partial lift injection under a state that a second lift amount is set as the maximum value of the needle lift amount, is carried out (refer to a two-dot chain line PLInj2). In this case, the fuel is injected between the timing t1 and a timing immediately after the timing t3.

The full lift injection is carried out as described below. That is, as shown in FIG. 6, when the injector actuation signal is changed from zero to the predetermined voltage VInj, the valve body 22 starts to move. Then, the lift amount of the valve body 22 reaches the maximum lift amount at the timing t4 and thus, the movement of the valve body 22 is restricted. Therefore, the needle lift amount is maintained at the maximum lift amount after the timing t4. When the injector actuation signal is changed from the predetermined voltage VInj to zero at the timing t5, the needle lift amount rapidly decreases from the maximum amount and reaches zero at the timing t6. The fuel is injected between the timings t1 and t6.

As the maximum value of the needle lift amount in the fuel injection decreases, a flow area between the tip end part of the needle valve 22 and the seat part Sh decreases as shown in FIG. 5(B). Therefore, a pressure of the fuel reaching the injection holes 21a from the fuel passage FP lowers. As a result, a penetration force of the fuel injected by the partial lift injection becomes smaller than the penetration force of the fuel injected by the full lift injection. Further, as the maximum value of the needle lift amount even in the partial lift injection decreases, the penetration force of the injected fuel weakens. The penetration force of the injected fuel strongly correlates with a moving speed (a flying speed) of the spray of the injected fuel. Therefore, as the penetration force weakens (in other words, as the maximum value of the needle lift amount in the fuel injection decreases), a time period between a timing of the injection of the fuel and a timing of the end of the passage of the injected fuel through an area adjacent to the spark generation part 30a of the spark plug 30 (that is, the ignition permissible time period) elongates.

Figure 7:
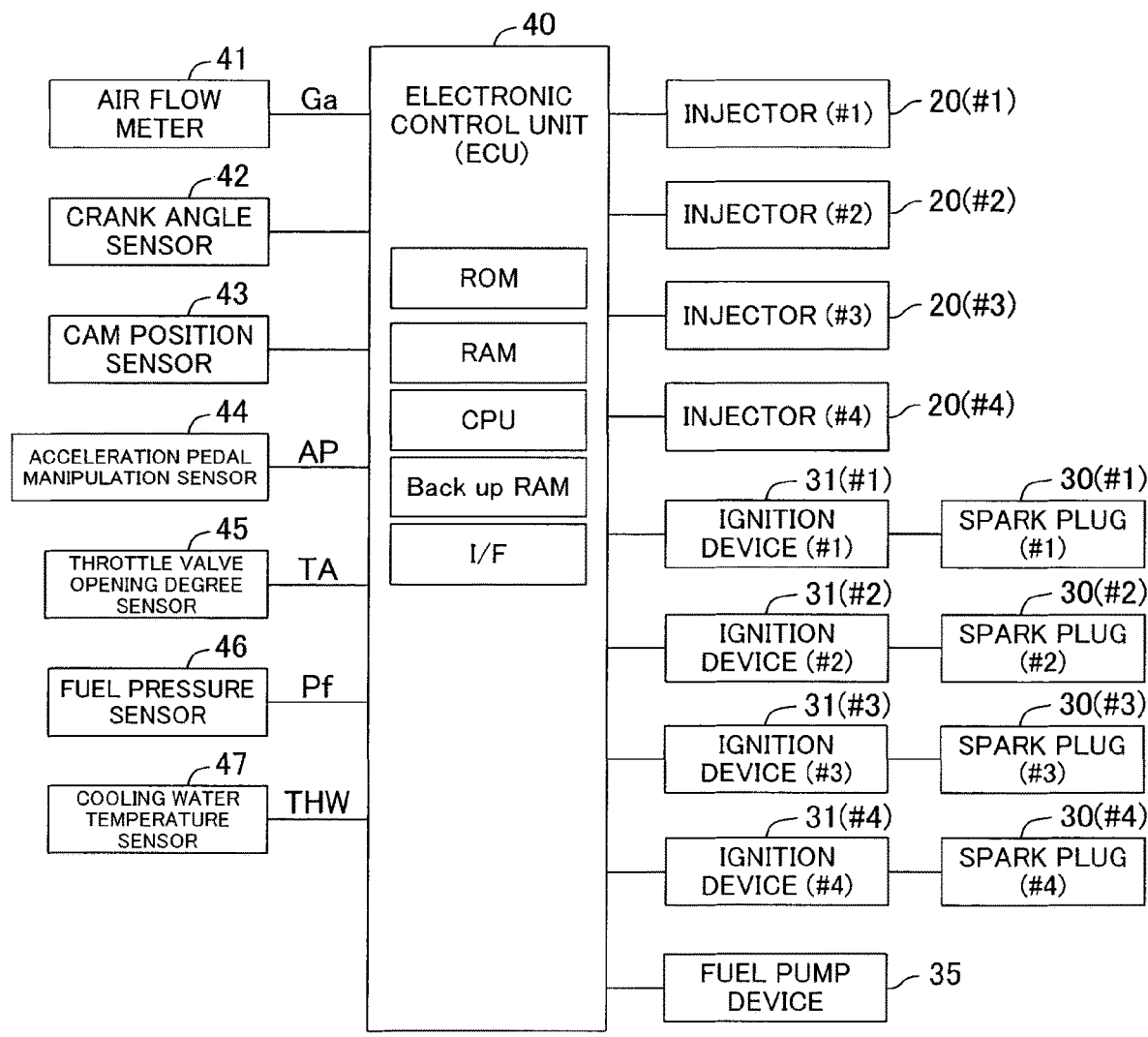
FIG. 7 is a block diagram of an electronic control unit of the first device.

The first device includes an electronic control unit (a control part) 40 as shown in FIG. 7. Hereinafter, the electronic control unit 40 will be referred to as "the ECU 40". The ECU 40 is an electronic circuit device including a microcomputer having a CPU, a ROM memorizing instructions (programs), a RAM, a back-up RAM, an interface, etc. which are well-known. The ECU 40 is configured to receive detection signals from sensors described below.

An air flow meter 41 for detecting an intake air amount (a mass flow rate of an air) Ga of the engine 10.

A crank angle sensor 42 for generating a pulse every a crank shaft not shown rotates by a predetermined angle width.

A cam position sensor 43 for generating a pulse every a cam shaft not shown rotates by a predetermined angle width.

An acceleration pedal manipulation amount sensor 44 for detecting a manipulation amount AP of an acceleration pedal not shown.

A throttle valve opening degree sensor 45 for detecting an opening degree TA of a throttle valve not shown.

A fuel pressure sensor 46 provided on a delivery pipe (a fuel delivery pipe) for supplying the fuel to the injectors 20 and which detects the fuel pressure Pf in the delivery pipe.

A cooling water temperature sensor 47 for detecting a cooling water temperature THW of the engine 10.

It should be noted that the ECU 40 is configured to acquire an absolute crank angle CA for each of the cylinders CC on the basis of the signals from the crank angle sensor 42 and the cam position sensor 43. In addition, the ECU 40 is configured to acquire an engine speed NE on the basis of the signal from the crank angle sensor 42.

The ECU 40 is configured to send actuation signals to actuators described below, respectively. In the following description, N corresponds to any of integars 1 to 4.

The injector 20(# N) of the Nth cylinder (# N).

The ignition device 31(# N) of the Nth cylinder (# N).

A fuel pump device 35.

It should be noted that the ignition device 31(# N) includes an igniter and a coil not shown. The ignition device 31(# N) is configured to generate a high voltage on the basis of an ignition signal (an actuation signal) generated by the ECU 40 at an ignition timing SA and apply the generated high voltage to the spark plug 30(# N) of the Nth cylinder (# N). A spark for igniting the fuel is generated from the spark generation part 30a(# N) of the spark plug 30(# N) of the Nth cylinder (# N) by the application of the high voltage to the spark plug 30.

The fuel pump device 35 includes a fuel pump and a fuel pressure regulation valve not shown. The fuel discharged by the fuel pump is supplied to the injector 20(# N) through the fuel delivery pipe not shown. The ECU 40 sends an actuation signal (an instruction signal) to the fuel pressure regulation valve to change the pressure of the fuel supplied to the injector 20(# N).

As described above, the ECU 40 sends the injector actuation signal to an electromagnetic mechanism of the injector 20(# N). When the injector actuation signal is zero, the solenoid 24 is under the non-energized state. On the other hand, when the injector actuation signal is the predetermined voltage VInj, the solenoid 24 is under the energized state.

<Summary of Control>

Figure 8:
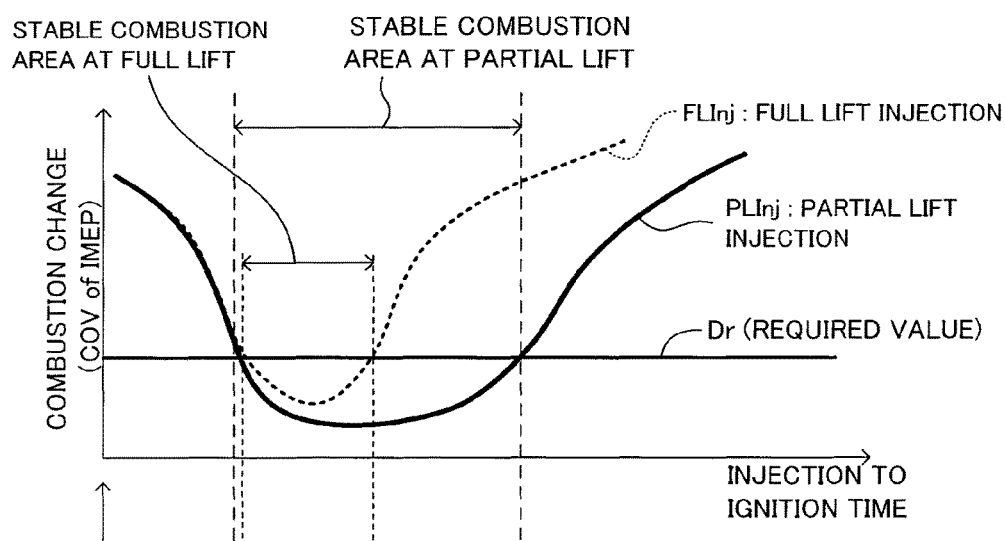
FIG. 8(A) is a view showing a change of a value expressing a combustion change with respect to a time period between an injection end timing and an ignition timing (a injection-to-ignition time period) and FIG. 8(B) is a view showing a change of a combustion efficiency with respect to the injection-to-ignition time period.
Figure 8:
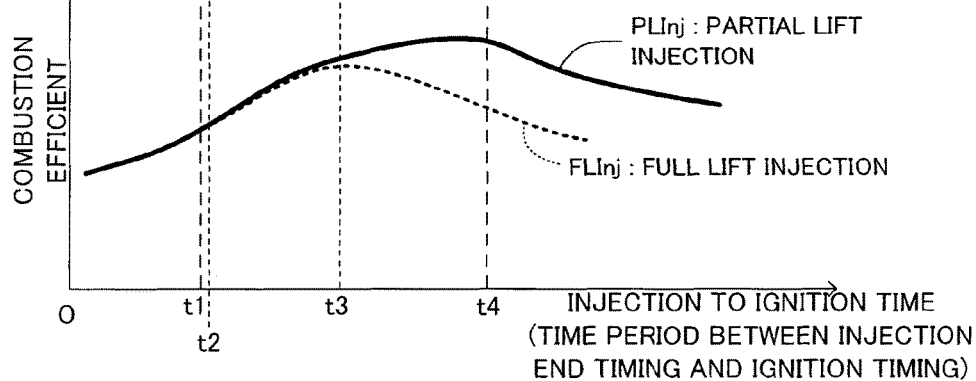

Next, the summary of the control by the first device will be described with reference to FIG. 8. The horizontal axes of the graphs shown in FIGS. 8(A) and 8(B) show a time period between "a timing of the end of the fuel injection carried out immediately before an ignition timing (a timing of the generation of the spark by the spark generation part 30a)" and "the ignition timing", respectively. Hereinafter, this time period will be referred to as "the injection-to-ignition time period" for convenience. Further, the fuel injection carried out immediately before the ignition timing may be referred to as "the preceding injection".

A value "COV of IMEP" indicated on the vertical axis of the graph shown in FIG. 8(A) expresses a combustion change. The IMEP means Indicated Mean Effective Pressure. The COV stands for the coefficient of variance. Therefore, the value indicated on the vertical axis of FIG. 8(A) is a value obtained by dividing a standard deviation of the indicated means effective pressure by a mean value of the indicated means effective pressure. This value decreases as the combustion is under the stable state during a plurality of cycles. The vertical axis of the graph shown FIG. 8(B) shows a combustion efficient (a ratio of a heat amount generated by the actual combustion with respect to a heat amount generated by a complete combustion).

In the graphs shown in FIGS. 8(A) and 8(B), the solid lines PLInj show values when the partial lift injection is carried out, respectively and the dashed lines FLInj show values when the full lift injection is carried out, respectively. This full lift injection is carried out under a state where the injector actuation signal is made zero at the timing t4 shown in FIG. 6 (the timing just when the needle lift amount reaches the maximum lift amount). A required value Dr shown in FIG. 8(A) corresponds to the combustion change value when the vibration of a vehicle which the engine 10 is installed is a permissible limit value.

<Full Lift Injection Execution>

As can be understood from the dashed lines FLInj shown in FIGS. 8(A) and 8(B), when the full lift injection is carried out and the injection-to-ignition time period is smaller than the time period t1, the combustion change is larger than the required value Dr (the combustion change is deteriorated) and the combustion efficient is low. This is because the ignition is carried out before the injected fuel (the fuel spray) reaches the spark generation part 30a and thus, the ignition and the combustion of the fuel are unstable. In addition, this is because the ignition is carried out under the insufficient vaporization of the injected fuel and thus, the amount of the fuel burning completely is small.

When the injection-to-ignition time period is between the time periods t1 and t3, the spray of the fuel including at least a part of the injected fuel exists around the spark generation part 30a. Therefore, the ignition and combustion of the fuel are stable by carrying out the ignition when the injection-to-ignition time period is between the time periods t1 and t3 and thus, the combustion change is small and the required value Dr is satisfied. It should be noted that during this time period (t1 to t3), as the injection-to-ignition time period increases, the vaporization of the fuel and the suction of the air into the fuel spray progresses and thus, the combustion efficient is improved. Hereinafter, the vaporization and the suction may be collectively simply referred to as "the vaporization".

When the injection-to-ignition time period is longer than the time period t3, the fuel spray passes the surroundings of the spark generation part 30a to diffuse. Therefore, if the ignition is carried out when the injection-to-ignition time period exceeds the time period t3, the ignition and the combustion is unstable and the combustion change is larger than the required value Dr. It should be noted that the combustion efficient is maintained at a relatively large value even after the time period t3. This is because the vaporization of the fuel progresses and thus, when the fuel is ignited, the proportion of the fuel burning completely is large.

Therefore, in order to generate the stable combustion when the full lift injection is carried out, it can be understood that a timing when the injection-to-ignition time period is between the time periods t1 to t3 should be set as the ignition timing. Further, the combustion efficient increases if a timing immediately before the timing t3 is set as the ignition timing.

<Partial Lift Injection>

As can be understood from the solid lines PLInj shown in FIGS. 8(A) and 8(B), if the partial lift injection is carried out when the injection-to-ignition time period is smaller than the time period t2 just longer than the time period t1, the combustion change is larger than the required value Dr (the combustion change is deteriorated) and the combustion efficient is small. This is because similar to the case of carrying out the full lift injection, the ignition is carried out before the injected fuel reaches the spark generation part 30a and thus, the ignition and the combustion of the fuel are unstable. In addition, this is because the ignition is carried out under a state where the vaporization of the injected fuel is insufficient and thus, the amount of the fuel burning completely is small.

The penetration force of the fuel (that is, the traveling speed of the fuel spray) injected by the partial lift injection is weaker than the penetration force of the fuel injected by the full lift injection. Therefore, the time period when the fuel spray including at least a part of the fuel injected by the partial lift injection exists around the spark generation part 30a increases. Accordingly, if the partial lift injection is carried out and then, the ignition is carried out when the injection-to-ignition time period is between the time period t2 and the time period t4 longer than the time period t3, the ignition and the combustion of the fuel are stable. As a result, the combustion change is small and the required value Dr is satisfied. When the injection-to-ignition time period is between the time periods t2 and t4, as the injection-to-ignition time period elongates, the vaporization of the fuel progresses and thus, the combustion efficient increases.

When the injection-to-ignition time exceeds the time period t4, the fuel spray passes the surroundings of the spark generation part 30a to diffuse. Therefore, if the ignition is carried out after the injection-to-ignition time period becomes longer than the time period t4, the ignition and the combustion of the fuel are unstable.

As can be understood from the above description, as the maximum value of the lift amount in the fuel injection decreases, the time period in which the ignition timing for realizing the stable combustion of the fuel can be set, elongates. In addition, as the time period between the injection end timing and the ignition timing elongates, the vaporization of the injected fuel progresses and thus, the combustion efficient increases. On the other hand, the ignition timing for maximizing the torque generated by the engine 10 is determined depending on the load of the engine 10 and the engine speed NE and thus, it is not preferred that the ignition is changed in terms of the fuel consumption. Accordingly, the first device and the control devices according to another embodiments change the injection end timing on the basis of the maximum value of the needle lift amount in the fuel injection carried out immediately before the ignition (in the preceding injection) so as to optimize the time period between the injection end timing and the ignition timing (that is, the spare time period). In particular, the first device and the control devices according to another embodiments change (advance) the injection end timing without changing the ignition timing so as to elongate the spare time period as the maximum value of the needle lift amount in the fuel injection decreases.

<Actual Actuation>

Figure 9:
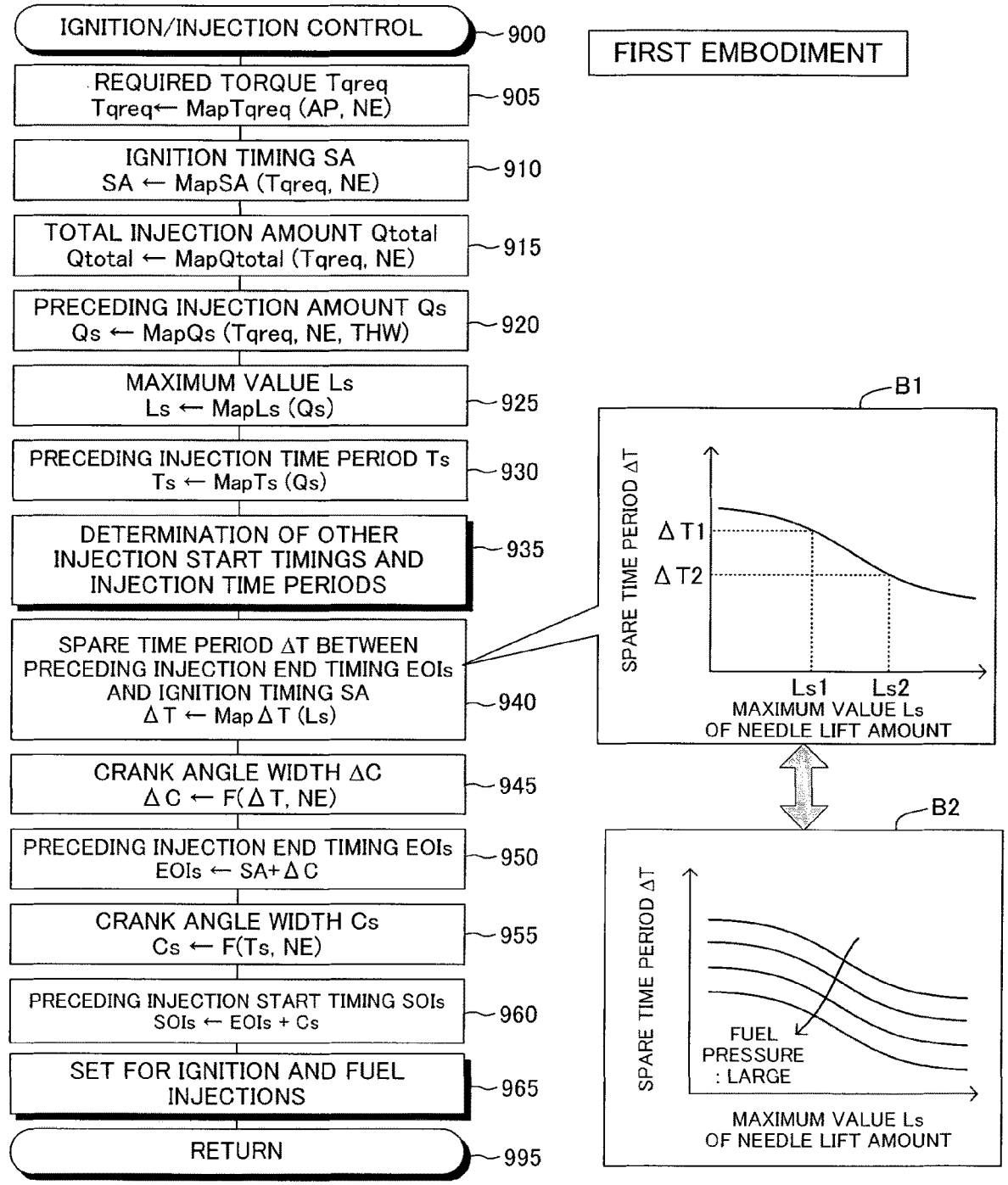
FIG. 9 is a flow chart showing a routine executed by a CPU of the electronic control unit shown in FIG. 7.

The CPU of the ECU 40 is configured to execute a process of the ignition/injection control routine shown in FIG. 9 by a flow chart in an optional cylinder every the crank angle of the optional cylinder corresponds to the intake top dead center of the optional cylinder.

Therefore, when the crank angle of a certain cylinder (a particular cylinder) corresponds to the intake top dead center of the particular cylinder, the CPU starts the process from the step 900 and executes the processes of the steps 905 to 965 described below in sequence. Then, the CPU proceeds to the step 995 where the CPU terminates the routine.

Step 905: The CPU determines a required toque (a torque required with respect to the engine 10) Tqreq by applying the acceleration pedal manipulation amount AP and the engine speed NE to a lookup table MapTqreq(AP, NE). According to the table MapTqreq(AP, NE), the determined required torque Tqreq increases as the acceleration pedal manipulation amount AP increases under a state where the engine speed NE is maintained at a predetermined constant engine speed.

Step 910: The CPU determines an ignition timing SA by applying the required torque Tqreq and the engine speed NE to a lookup table MapSA(Tqreq, NE). According to the table MapSA(Tqreq, NE), the MBT (Minimum Spark Advance For Best Torque) is set as the ignition timing SA as far as no knocking occurs. Further, the ignition timing is determined as a crank angle before the compression top dead center. Therefore, as the ignition timing SA increases, the ignition timing SA advances (refer to FIGS. 10(A) and 10(B)). It should be noted that the ignition timing SA may be determined on the basis of the engine load KL and the engine speed NE.

Step 915: The CPU calculates a total amount Qtotal of the fuel to be supplied (injected) to the particular cylinder during the combustion stroke of the particular cylinder. Hereinafter, the total amount Qtotal will be referred to as "the total injection amount". In particular, the CPU determines the total injection amount Qtotal by applying the required torque Tqreq and the engine speed NE to a lookup table MapQtotal(Tqreq, NE). According to the table MapQtotal(Tqreq, NE), the determined total injection amount Qtotal increases as the required torque Tqreq increases under a state where the engine speed NE is maintained at a predetermined constant engine speed.

Step 920: The CPU determines an amount (the preceding injection amount) Qs of the fuel injected by the fuel injection (the preceding injection) immediately before the ignition timing SA (refer to FIG. 10(B)). In particular, the CPU determines the preceding injection amount Qs by applying the required torque Tqreq, the engine speed NE and the cooling water temperature THW to a lookup table MapQs (Tqreq, NE, THW). According to the table MapQs(Tqreq, NE, THW), the determined preceding injection amount Qs increases as the required torque Tqreq (that is, a value depending on the amount of the air sucked into the cylinder CC in the intake stroke) increases. Further, according to the table MapQs(Tqreq, NE, THW), the determined preceding injection amount Qs increases as the cooling water temperature THW lowers. Furthermore, an amount corresponding to about 20 percent of the total injection amount Qtotal is set as the preceding injection amount Qs. It should be noted that the preceding injection is indicated by InjC in the FIGS. 10(A) and 10(B) described below.

Step 925: The CPU determines the maximum value Ls of the needle lift amount in the preceding injection InjC on the basis of the preceding injection amount Qs (refer to FIG. 10(B)). In particular, the CPU determines the maximum value Ls of the lift amount by applying the preceding injection amount Qs to a lookup table MapLs(Qs).

Step 930: The CPU determines a fuel injection time period Ts regarding the preceding injection InjC on the basis of the preceding injection amount Qs (refer to FIG. 10(B)). Hereinafter, the fuel injection time period Ts may be referred to as "the preceding injection time period". The injector actuation signal is maintained at the voltage VInj during the fuel injection time period. In particular, the CPU determines the preceding injection time period Ts by applying the preceding injection amount Qs to a lookup table MapTs(Qs). As can be understood from the wave line of the lift amount of the preceding injection InjC shown in FIG. 10(B), there is a predetermined relationship between the maximum value Ls of the lift amount and the preceding injection time period Ts in which when one of the value Ls and the time period Ts is determined, the other of the value Ls and the time period Ts is determined.

Step 935: The CPU determines a start timing, a fuel injection time period, etc. regarding the other fuel injections. In this embodiment, as shown in FIG. 10(A), three fuel injections are carried out for one combustion stroke. In particular, the fuel is injected in one cycle of the particular cylinder by an intake stroke injection InjA carried out in the intake stroke, a pre-injection InjB carried out in a latter half of the compression stroke and the preceding injection InjC described above. The pre-injection InjB is carried out immediately before the preceding injection InjC.

The CPU aquires an amount of about 0 to about 15 percent of the total injection amount Qtotal as the injection amount (the pre-injection amount) Qb of the pre-injection InjB. In particular, the CPU acquires the pre-injection amount Qb by applying the required torque Tqreq, the cooling water temperature THW and the engine speed NE to a predetermined lookup table MapQb(Tqreq, THW, NE).

It should be noted that for example, the pre-injection amount Qb may be zero, for example, when the cooling water temperature THW is higher than or equal to a threshold value, the engine speed NE is larger than or equal to a threshold value and the required torque Tqreq is larger than or equal to a threshold value. In other words, the pre-injection InjB is not carried out in some cases.

Further, the pre-injection InjB is realized by one of the partial and full lift injections. Accordingly, the CPU acquires the maximum value Lb of the needle lift amount of the pre-injection InjB by applying the pre-injection amount Qb to a predetermined lookup table MapLb(Qb). Furthermore, the CPU determines the pre-injection time period Tb by applying the pre-injection amount Qb to a lookup table MapTb(Qb).

In addition, the CPU determines the injection start timing SOIb of the pre-injection InjB as a predetermined timing between 50 to 30 degree crank angle before the compression top dead center (BTDC) on the basis of the cooling water temperature THW and the engine speed NE. In this embodiment, in order to reduce the amount of the fuel adhering to the top wall face of the piston, the determined injection start timing SOIb of the pre-injection InjB advances as the cooling water temperature THW lowers. The CPU acquires the injection end timing EOIb of the pre-injection InjB by a calculation using the injection start timing SOIb of the pre-injection InjB, the pre-injection time period Tb and the engine speed NE (refer to FIG. 10(B)).

The CPU acquires an amount of 60 to 70 percent of the total injection amount Qtotal as the injection amount (the intake stroke injection amount) Qa of the intake stroke injection InjA. The intake stroke injection amount Qa is equal to a value obtained by subtracting the preceding injection amount Qs and the pre-injection amount Qb from the total injection amount Qtotal (Qa=Qtotal−(Qs+Qb)). Further, the CPU acquires the injection time period Ta for injecting the intake stroke injection amount Qa of the fuel on a basis of a lookup table MapTa(Qa) and determines a predetermined timing around 60 degree crank angle after the intake top dead center as the injection start timing SOIa of the intake stroke injection InjA. Further, the CPU acquires the injection end timing EOIa of the intake stroke injection InjA by a calculation using the injection start timing SOIa of the intake stroke injection InjA, the injection time period Ta and the engine speed NE. It should be noted that the intake stroke injection InjA is realized by the full lift injection.

Step 940: The CPU determines a spare time period ΔT between the injection end timings EOIs of the preceding injection InjC and the ignition timing SA on the basis of the maximum value Ls of the needle lift amount in the preceding injection InjC in order to determine the injection end timing EOIs of the preceding injection InjC. In particular, the CPU determines the spare time period ΔT by applying the maximum value Ls acquired at the step 925 to a lookup table MapΔT(Ls) shown in the block B1 of FIG. 9. As described above, the spare time period ΔT is previously determined by an experiment, etc., associating with the maximum value Ls of the needle lift amount so as to maximize the combustion efficient (that is, maximize the spare time period ΔT) as far as the combustion change satisfies the required value Dr and is memorized in the ROM in the form of a table MapΔT(Ls). As shown in the block B1 of FIG. 9, according to this table MapΔT(Ls), the determined spare time period ΔT shortens as the maximum value Ls increases. For example, when the maximum value Ls of the needle lift amount corresponds to a first value Ls1, the acquired spare time period ΔT is a first time period ΔT1. When the maximum value Ls of the needle lift amount corresponds to a second value Ls2 larger than the first value Ls1, the acquired spare time period ΔT is a second time period ΔT2 shorter than the first time period ΔT1.

Step 945: The CPU converts the spare time period ΔT acquired at the step 940 to the corresponding crank angle width ΔC on the basis of the engine speed NE (refer to FIG. 10(B)). Hereinafter, the crank angle width ΔC will be referred to as "the spare crank angle width".

Step 950: The CPU determines the injection end timing EOIs of the preceding injection InjC by adding the spare crank angle width ΔC to the ignition timing SA (EOIs=SA+ΔC, refer to FIG. 10(B)).

Step 955: The CPU converts the preceding injection time period Ts acquired at the step 930 to the corresponding crank angle width Cs on the basis of the engine speed NE (refer to FIG. 10(B)).

Step 960: The CPU determines the injection start timing SOIs of the preceding injection InjC by adding the crank angle width Cs to the injection end timing EOIs of the preceding injection InjC (SOIs=EOIs+Cs, refer to FIG. 10(B)).

Step 965: The CPU executes a process for carrying out the ignition at the ignition timing SA and processes for carrying out the intake stroke injection InjA, the pre-injection InjB and the preceding injection InjC, respectively. Thereby, for example, the preceding injection InjC starts when the crank angle corresponds to the injection start timing SOIs of the preceding injection InjC and ends when the crank angle corresponds to the injection end timing EOIs of the preceding injection InjC. In addition, The value Ls is set as the maximum value of the needle lift amount in the preceding injection InjC.

As described above, the first device includes a control part (the ECU 40) configured to:

execute the fuel injection by the injector 20 (the step 965 of FIG. 9);

change the maximum value Ls of the lift amount of the valve body 22 in the fuel injection to change the penetration force of the injected fuel (the step 925 of FIG. 9); and control the ignition timing SA to generate the spark from the spark generation part 30a on the basis of the operation state of the engine 10 (for example, the required torque Tqreq, the engine speed NE) (the steps 910 and 965 of FIG. 9, etc.).

Further, the control part is configured to change the injection end timing EOIs of the preceding injection InjC such that "the time period (the spare time period ΔT1) between the injection end timing EOIc of the preceding injection InjC and the ignition timing SA under a state where the first value (Ls1) is set as the maximum value Ls of the lift amount in the fuel injection InjC (the preceding injection InjC) carried out immediately before the ignition timing SA, is longer than the time period (the spare time period ΔT2) between the injection end timing EOIs of the preceding injection InjC and the ignition timing SA under a state where the second value (Ls2) larger than the first value (Ls1) is set as the maximum value Ls of the lift amount in the preceding injection InjC (refer to the steps 940 to 950 and the block B1 of FIG. 9).

Therefore, the ignition can be carried out when at least a part of the spray of the fuel injected by the preceding injection InjC exists at an area adjacent to the spark generation part 30a and thus, the combustion change can be decreased. Further, the ignition can be carried out after a long time as possible elapses from the fuel injection timing (for example, the injection end timing EOIs of the preceding injection InjC) as far as the combustion change is not deteriorated, and thus, the combustion is generated under a state where the vaporization of the fuel and the suction of the air into the fuel spray progress. As a result, the combustion efficient can be improved.

It should be noted that the CPU may be configured to determine the spare time period ΔT at the step 940 of FIG. 9 on the basis of the fuel pressure Pf at the timing of carrying out the preceding injection InjC as well as the maximum value Ls of the needle lift amount. The penetration force of the injected fuel increases as the fuel pressure Pf increases. Therefore, as shown in the block B2 of FIG. 9, the CPU determines the spare time period ΔT such that the spare time period ΔT shortens as the pressure Pf increases. Thereby, even when the fuel pressure Pf changes, the combustion change can be maintained at a small value and the combustion efficient can be improved. When the spare time period ΔT is determined by using the fuel pressure Pf at the timing of carrying out the preceding injection InjC, it is preferred that the calculation of the spare time period ΔT is carried out immediately before the preceding injection InjC is expected to be carried out. However, when the fuel pressure Pf changes moderately and thus, the amount of the change of the fuel pressure Pf in one rotation of the engine 10 is almost zero, the fuel pressure Pf acquired at a timing around the intake top dead center may be used as the fuel pressure Pf at the timing of carrying out the preceding injection InjC.

Second Embodiment

The control device of the engine according to the second embodiment of the invention (hereinafter, this device will be referred to as "the second device") is the same as the first device except that the second device changes the spare time period ΔT in consideration of the influence of the gas flow in the cylinder generated by the pre-injection InjB on the fuel (the fuel spray) injected by the preceding injection InjC. As described above, the pre-injection InjB is carried out just before the preceding injection InjC carried out in the compression stroke.

Figure 11:
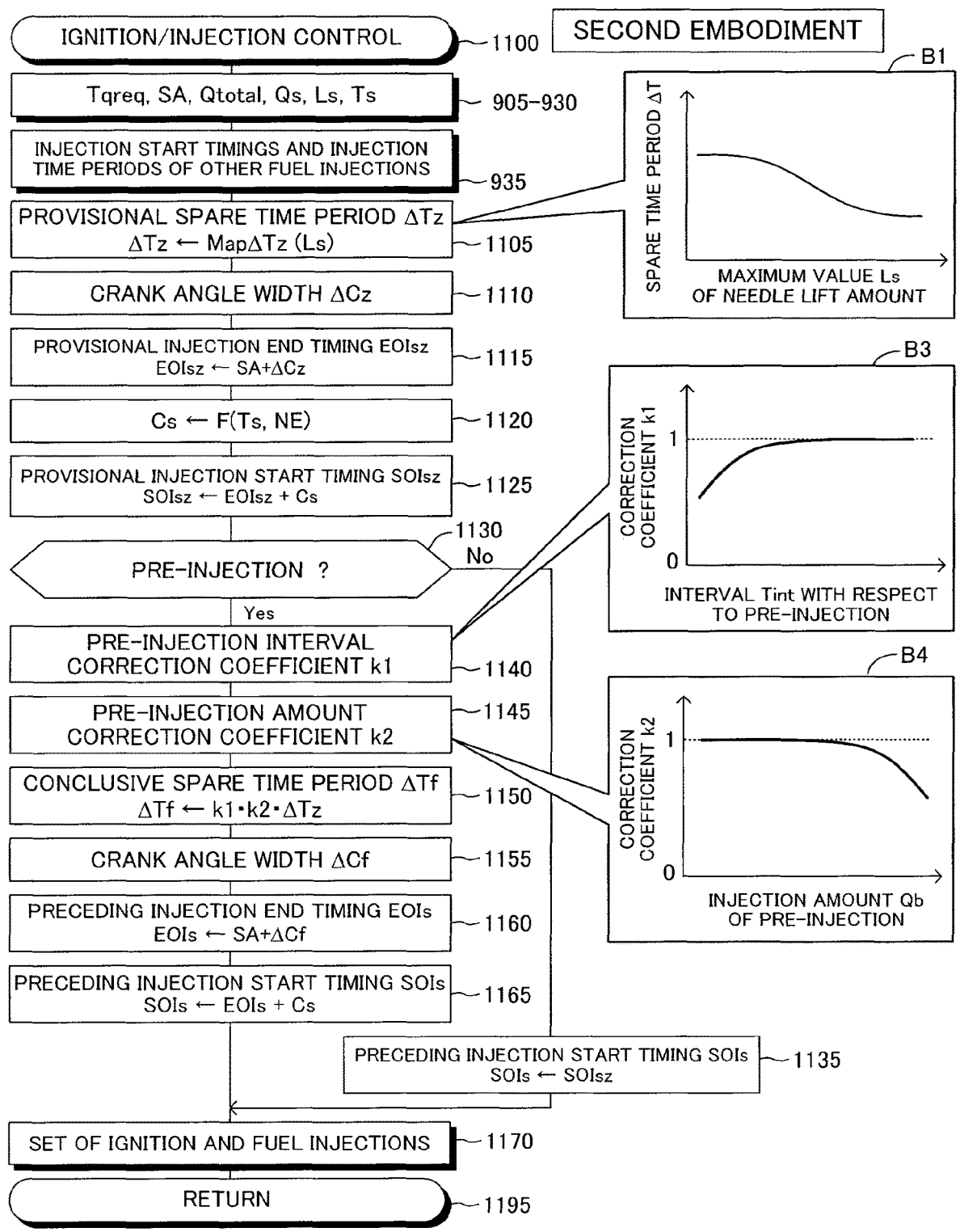
FIG. 11 is a flow chart showing a routine executed by the CPU of a control device (a second device) according to a second embodiment of the invention.

In particular, the CPU of the second device is configured to execute a process of the ignition/injection control routine shown in FIG. 11 by a flow chart in an optional cylinder every the crank angle of the optional cylinder corresponds to the intake top dead center of the optional cylinder.

Therefore, when the crank angle of a certain cylinder (a particular cylinder) corresponds to the intake top dead center of the particular cylinder, the CPU starts a process from the step 1100 of FIG. 11 and executes the processes of the steps 905 to 930 in sequence. Thereby, the required torque Tqreq, the ignition timing SA, the total injection amount Qtotal, the preceding injection amount Qs, the maximum value Ls of the needle lift amount in the preceding injection InjC, the fuel injection time period (the preceding injection time period) Ts in the preceding injection InjC, etc. are determined. Next, the CPU executes a process of the step 935 described above to determine the fuel injection start timing, the fuel injection end timing, the fuel injection time period, etc. of the other fuel injections.

Next, the CPU executes processes of the steps 1105 to 1125 described below in sequence and then, proceeds to the step 1130.

Step 1105: This is a step for acquiring a provisional spare time period ΔTz by the process similar to the process of the step 940 described above. That is, the CPU determines the provisional spare time period ΔTz between the provisional injection end timing EOIsz of the preceding injection InjC and the ignition timing SA on the basis of the maximum value Ls of the needle lift amount in the preceding injection InjC to determine the provisional injection end timing EOIsz of the preceding injection InjC. As shown in the block B1 of FIG. 11, a lookup table MapΔTz(Ls) used in this step is the same as the lookup table MapΔT(Ls) shown in the block B1 of FIG. 9 and used in the step 940. Hereinafter, the provisional injection end timing EOIsz will be referred to as "the provisional end timing".

Step 1110: The CPU executes a process similar to the process of the step 945 described above. That is, the CPU converts the provisional spare time period ΔTz to the corresponding crank angle width ΔCz on the basis of the engine speed NE. Hereinafter, the crank angle width ΔCz will be referred to as "the provisional spare crank angle width".

Step 1115: The CPU executes a process similar to the process of the step 950 described above. That is, the CPU determines the provisional end timing EOIsz by adding the provisional spare crank angle width ΔCz to the ignition timing SA (EOIsz=SA+ΔCz).

Step 1120: The CPU executes a process similar to the process of the step 955 described above. That is, the CPU converts the preceding injection time period Ts acquired at the step 930 to the corresponding crank angle width Cs on the basis of the engine speed NE.

Step 1125: The CPU executes a process similar to the process of the step 960 described above. That is, the CPU determines the provisional injection start timing SOIsz of the preceding injection InjC by adding the crank angle width Cs to the provisional end timing EOIsz of the preceding injection InjC (SOIsz=EOIsz+Cs). Hereinafter, the provisional injection start timing SOIsz will be referred to as "the provisional start timing".

Next, the CPU proceeds to the step 1130 where the CPU judges if there is the pre-injection InjB. When there is not the pre-injection InjB (that is, the pre-injection amount Qb is zero), the CPU judges "No" at the step 1130 to proceed to the step 1135 where the CPU employs the provisional start timing SOIsz as the conclusive injection start timing SOIs of the preceding injection InjC. Therefore, the conclusive injection end timing EOIs of the preceding injection InjC corresponds to the provisional end timing EOIsz of the preceding injection InjC. Then, the CPU proceeds to the step 1170 where the CPU executes a setting process for carrying out the ignition and each of the injections similar to the process of the step 965 described above. Next, the CPU proceeds to the step 1195 where the CPU terminates the routine.

On the other hand, when there is the pre-injection InjB, the CPU judges "Yes" at the step 1130 and then, executes the processes of the steps 1140 to 1165 in sequence as described below.

Step 1140: The CPU first acquires an interval between the preceding injection InjC and the pre-injection InjB. Hereinafter, the interval will be referred to as "the interval Tint with respect to the pre-injection InjB". In detail, as shown in FIG. 10(B), the interval Tint with respect to the pre-injection InjB corresponds to the time period between the injection end timing EOIb of the pre-injection InjB and the provisional start timing SOIsz of the preceding injection InjC. In other word, the interval Tint with respect to the pre-injection InjB corresponds to the time period obtained by converting the crank angle width between the timings EOIb and SOIsz on the basis of the engine speed NE. Next, the CPU determines a correction coefficient k1 by applying the acquired interval Tint with respect to the pre-injection InjB to a lookup table Mapk1(Tint) shown in the block B3 of FIG. 11. According to the table Mapk1(Tint), the determined correction coefficient k1 decreases within a range up to 1 as the interval Tint with respect to the pre-injection InjB shortens. The maximum value of the correction coefficient k1 is 1.

Figure 12:
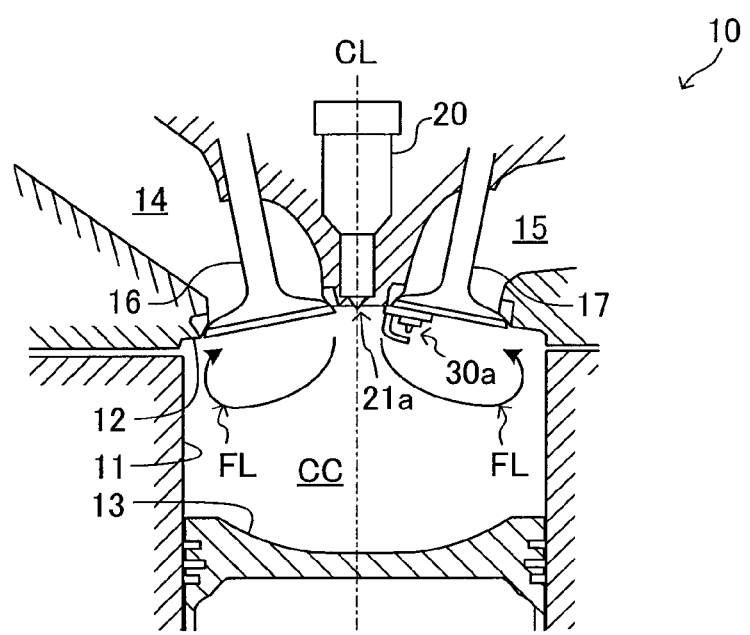
FIG. 12 is a schematic longitudinal sectional view of one of the cylinders, showing gas flows generated in the combustion chamber shown in FIG. 1.

The correction coefficient k1 is multiplied the provisional spare time period $\Delta Tz$ to determine the conclusive spare time period $\Delta Tf$ at the step 1150 described below. Thereby, the conclusive spare time period $\Delta Tf$ shortens as the correction coefficient k1 decreases. The reason for shortening the spare time period $\Delta Tf$ as the interval Tint with respect to the pre-injection InjB, is as follows. That is, the flow of the gas (the residual gas flow or the gas flow) is formed by the pre-injection InjB shown by an arrow FL in FIG. 12. Then, the gas flow remains strong at the timing of carrying out preceding injection InjC and the fuel (the fuel spray) injected by the preceding injection InjC rides on this gas flow. Therefore, the time period until the fuel reaches the spark generation part 30a after the fuel is injected, shortens. Therefore the spare time period $\Delta Tf$ is shortened. Thus, the interval Tint with respect to the pre-injection InjB is one of first parameters having a correlation with the strength of the residual gas flow.

Step 1145: The CPU determines a correction coefficient k2 by applying the injection amount Qb of the pre-injection InjB to a lookup table Mapk2(Qb) shown in the block B4 of FIG. 11. According to the table Mapk2(Qb), the determined correction coefficient k2 decreases within a range up to 1 as the injection amount Qb of the pre-injection InjB increases. The maximum value of the correction coefficient k2 is 1.

Similar to the correction coefficient k1, the correction coefficient k2 is multiplied the provisional spare time period $\Delta Tz$ to determine the conclusive spare time period $\Delta Tf$ at the step 1150 described below. Thereby, the conclusive spare time period $\Delta Tf$ shortens as the correction coefficient k2 decreases. The reason for shortening the spare time period $\Delta Tf$ as the fuel injection amount Qb of the pre-injection InjB, is as follows. That is, the gas flow formed by the pre-injection InjB indicated by the arrow FL in FIG. 12 remains strong at the timing of carrying out the preceding injection InjC as the injection amount Qb of the pre-injection InjB. Therefore, the fuel (the fuel spray) injected by the preceding injection InjC rides on the gas flow and thus, the time until the fuel reaches the spark generation part 30a after the fuel is injected, shortens. Therefore, the conclusive spare time period $\Delta Tf$ is shortened. Thus, the injection amount Qb of the pre-injection InjB is one of the first parameters having a correlation with the strength of the residual gas flow.

Step 1150: The CPU calculates the conclusive spare time period $\Delta Tf$ by multiplying the provisional spare time period $\Delta Tz$ by the correction coefficients k1 and k2 ($\Delta Tf = k1 \ast k2 \ast \Delta Tz$).

Step 1155: The CPU executes processes similar to the processes of the steps 945 and 1110 described above. That is, the CPU converts the conclusive spare time period $\Delta Tf$ to the corresponding crank angle width $\Delta Cf$ on the basis of the engine speed NE.

Step 1160: The CPU executes processes similar to the processes of the steps 950 and 1115 described above. That is, the CPU determines the conclusive injection end timing EOIs of the preceding injection InjC by adding the crank angle width $\Delta Cf$ to the ignition timing SA (EOIs=SA+$\Delta Cf$).

Step 1165: The CPU executes processes similar to the processes of the steps 960 and 1125 described above. That is, the CPU determines the conclusive injection start timing SOIs of the preceding injection InjC by adding the crank angle width Cs to the injection end timing EOIs of the preceding injection InjC (SOIs=EOIs+Cs).

Then, the CPU proceeds to the step 1170 where the CPU executes a setting process for carrying out the ignition and each of the injections similar to the process of the step 965 described above. Next, the CPU proceeds to the step 1195 where the CPU terminates the routine.

As described above, the control part (the ECU 40) of the second device is configured to:

execute the fuel injection by the injector 20 as the pre-injection InjB in addition to the preceding injection InjC before the preceding injection InjC (the steps 935 and 1170 of FIG. 11); and change the injection end timing EOIs of the preceding injection InjC such that the time period between the injection end timing EOIs of the preceding injection InjC and the ignition timing SA (the spare time period $\Delta Tf$) shortens as the time period between the injection end timing EOIb of the pre-injection InjB and the injection start timing SOIsz of the preceding injection InjC (the interval Tint with respect to the pre-injection InjB) shortens (refer to the block B3 and the steps 1140 and 1150 to 1160 of the FIG. 11, etc.).

Further, the control part (the ECU 40) is configured to change the injection end timing EOIs of the preceding injection InjC such that the time period between the injection end timing EOIs of the preceding injection InjC and the ignition timing SA (the spare time period $\Delta Tf$) shortens as the amount Qb of the fuel injected by the pre-injection InjB increases (refer to the block B4 and the steps 1145 and 1150 to 1160 of FIG. 11, etc.).

Thereby, the spare time period can be changed depending on the strength of the gas flow (the residual gas flow) formed in the cylinder by the pre-injection InjB and remaining in the cylinder at the timing of carrying out the preceding injection InjC. Therefore, the undesirable influence of the residual gas flow on the combustion change and/or the combustion efficient can be reduced. That is, even when the ignition permissible time period described above changes due to the residual gas flow, the deterioration of the combustion change can be prevented and the combustion efficient can be improved. Preferably, the second device (and modifications thereof described below) changes the injection end timing EOIb (and the injection start timing SOIb) of the pre-injection InjB by a predetermined crank angle width when the second device changes the injection end timing EOIs (and the injection start timing SOIs) of the preceding injection InjC by a predetermined crank angle width.

First Modification of Second Embodiment

As the fuel pressure Pf at the timing of carrying out the pre-injection InjB increases, the strength of the gas flow formed in the cylinder by the pre-injection InjB increases and thus, the residual gas flow is strong. That is, the fuel pressure Pf at the timing of carrying out the pre-injection InjB is one of the first parameters having a correlation with the strength of the residual gas flow. Accordingly, the first modification shortens the spare time period $\Delta Tf$ as the fuel pressure Pf at the timing of carrying out the pre-injection InjB increases.

Figure 13:
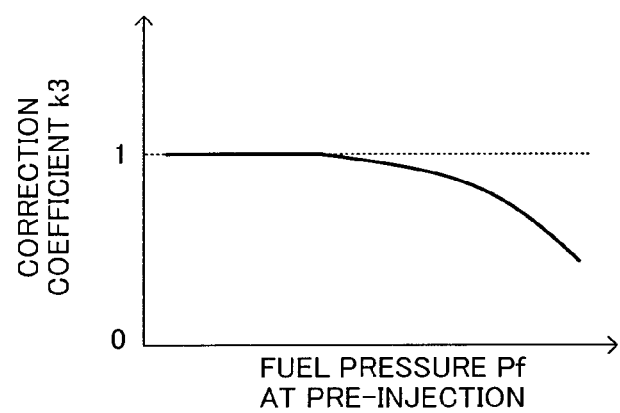
FIG. 13 is a graph showing a relationship between a fuel pressure in the pre-injection and a correction coefficient.

In particular, the CPU according to the first modification executes a process for acquiring a correction coefficient k3 between the steps 1145 and 1150 of FIG. 11. That is, the CPU acquires the fuel pressure Pf at the timing of carrying out the pre-injection InjB and acquires the correction coefficient k3 by applying the acquired fuel pressure Pf to a lookup table Mapk3(Pf) shown in FIG. 13. According to the table Mapk3(Pf), the determined correction coefficient k3 decreases within a range up to 1 as the fuel pressure Pf at the timing of carrying out the pre-injection InjB increases. For example, the fuel pressure Pf at the timing of carrying out the pre-injection InjB may be a fuel pressure Pf at the injection start timing SOIb of the pre-injection InjB or may be a fuel pressure Pf at a predetermined timing between the injection start and end timings SOIb and EOIb of the pre-injection InjB. However, in this cases, the timings of the calculations of the correction coefficient k3 and the conclusive spare time period $\Delta Tf$ are preferably after the injection start timing of the pre-injection InjB and before the injection start timing of the preceding injection InjC. When the fuel pressure Pf changes moderately and thus, the amount of the change of the fuel pressure Pf in one rotation of the engine 10 is almost zero, the fuel pressure Pf acquired at a timing around the intake top dead center may be used as the fuel pressure Pf at the timing of carrying out the pre-injection InjB.

Further, the CPU according to the first modification calculates the conclusive spare time period $\Delta Tf$ by multiplying the provisional spare time period $\Delta Tz$ by the product of the correction coefficients k1, k2 and k3 at the step 1150 of FIG. 11 ($\Delta Tf=k1*k2*k3*\Delta Tz$). The other features of the first modification are the same as the features of the second device. According to the first modification, even when the strength of the gas flow in the cylinder changes due to the fuel pressure Pf at the timing of carrying out the pre-injection InjB and thereby, the strength of the residual gas flow changes and thus, the ignition permissible time period described above changes, the deterioration of the combustion change can be prevented and the combustion efficient can be improved.

Second Modification of Second Embodiment

As the maximum value Lb of the needle lift amount in the pre-injection InjB increases, the strength of the gas flow in the cylinder formed by the pre-injection InjB increases. That is, the maximum value Lb of the needle lift amount in the pre-injection InjB is one of the first parameters having a correlation with the strength of the residual gas flow. Accordingly, the second modification shortens the spare time period $\Delta Tf$ as the maximum value Lb of the needle lift amount in the pre-injection InjB increases.

Figure 14:
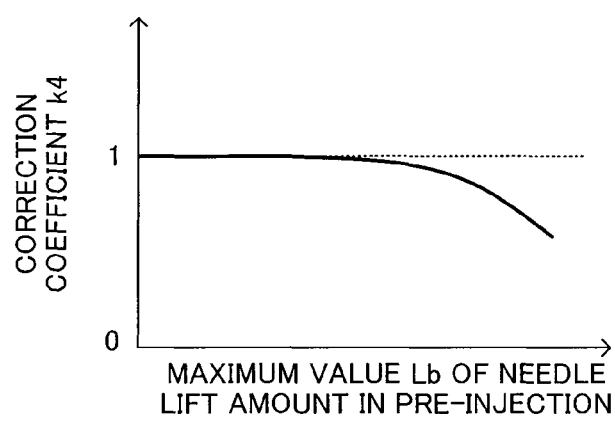
FIG. 14 is a graph showing a relationship between a maximum value of the needle lift amount in the pre-injection and a correction coefficient.

In particular, the CPU according to the second modification executes a process for acquiring the correction coefficient k3 and a correction coefficient k4 between the steps 1145 and 1150 of FIG. 11. The CPU acquires the correction coefficient k3 as described above. Further, the CPU acquires the correction coefficient k4 by applying the maximum value Lb of the needle lift amount in the pre-injection InjB to a lookup table Mapk4(Lb) shown in FIG. 14. According to the table Mapk4(Lb), the determined correction coefficient k4 decreases within a range up to 1 as the maximum value Lb of the needle lift amount increases.

Furthermore, the CPU according to the second modification calculates the conclusive spare time period $\Delta Tf$ by multiplying the provisional spare time period $\Delta Tz$ by the product of the correction coefficients k1, k2, k3 and k4 at the step 1150 of FIG. 11 ($\Delta Tf=k1*k2*k3*k4*\Delta T$). The other features of the second modification are similar to the features of the first modification of the second device. According to the second modification, even when the strength of the gas flow in the cylinder changes due to the maximum value Lb of the needle lift amount in the pre-injection InjB and thereby, the strength of the residual gas flow changes and thus, the ignition permissible time period described above changes, the deterioration of the combustion change can be prevented and the combustion efficient can be improved.

Third Modification of Second Embodiment

The correction coefficients k1 to k4 are correction amount for correcting the spare time period so as to eliminate the influence of the strength of the residual gas flow generated by the pre-injection InjB on the ignition permissible time period (in other words, the spare time period). In other words, the parameters for acquiring the correction coefficients (that is, the interval Tint with respect to the pre-injection InjB, the injection amount Qb of the pre-injection InjB, the fuel pressure Pf=Pfb at the timing of carrying out the pre-injection InjB and the maximum value Lb of the needle lift amount in the pre-injection InjB for acquiring the correction coefficients) have correlations with the strength of the gas flow in the cylinder, respectively. Accordingly, the CPU according to the third modification estimates the strength of the residual gas flow CF on the basis of these parameters and shortens the spare time period $\Delta Tf$ as the estimated strength CF increases.

In particular, the CPU according to the third modification executes a process for acquiring a correction coefficient kCF in place of the processes of the steps 1140 and 1145 of FIG. 11. That is, the CPU first estimates the strength CF of the residual gas flow on the basis of a function expression fcf described below. "a1" to "a4" are predetermined constants, respectively. The function expression fcf may be another function expression or a lookup table. The CPU may estimate the strength CF of the residual gas flow on the basis of two or more of the parameters such as the interval Tint with respect to the pre-injection InjB, the injection amount Qb of the pre-injection InjB, the fuel pressure Pf at the timing of carrying out the pre-injection InjB and the maximum value Lb of the needle lift amount in the pre-injection InjB. Alternatively, the CPU may estimate the strength CF of the residual gas flow on the basis of one or more of the parameters such as the interval Tint with respect to the pre-injection InjB, the injection amount Qb of the pre-injection InjB, the fuel pressure Pf at the timing of carrying out the pre-injection InjB and the maximum value Lb of the needle lift amount in the pre-injection InjB. Further, the CPU may estimate the strength CF of the residual gas flow on the basis of two or more of the parameters such as the interval Tint with respect to the pre-injection InjB, the injection amount Qb of the pre-injection InjB and the fuel pressure Pf at the timing of carrying out the pre-injection InjB. The strength CF of the residual gas flow acquired as described above is the first parameter having a correlation with the strength of the residual gas flow.

$$CF = fcf(\text{Tint}, Qb, Pfb, Lb)$$
$$= a1/\text{Tint} + a2*Qb + a3*Pfb + a4*Lb$$

Figure 15:
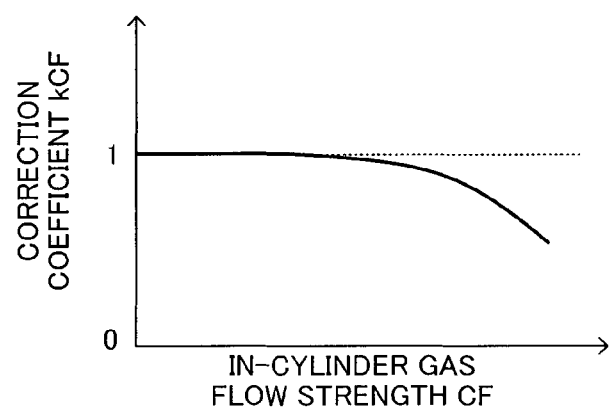
FIG. 15 is a graph showing a relationship between a strength of the gas flow generated in the cylinder by the pre-injection and a correction coefficient.

Next, the CPU acquires the correction coefficient kCF by applying the strength CF of the residual gas flow to a lookup table MapkCF(CF) shown in FIG. 15. According to the table MapkCF(CF), the determined correction coefficient kCF decreases within a range up to 1 as the strength CF of the residual gas flow increases.

Further, the CPU calculates the conclusive spare time period ΔTf by multiplying the provisional spare time period ΔTz by the correction coefficient kCF at the step 1150 of FIG. 11 (ΔTf=kCF*ΔTz). The other features of the third modification are similar to the features of the second device. According to the third modification, even when the strength of the gas flow in the cylinder generated by the pre-injection InjB changes and thereby, the strength CF of the residual gas flow changes and thus, the ignition permissible time period described above changes, the deterioration of the combustion change can be prevented and the combustion efficient can be improved.

Third Embodiment

The control device of the engine according to the third embodiment of the invention (hereinafter, this control device will be referred to as "the third device") is the same as the second device except that the third device changes the spare time period ΔT in consideration of the influence of the flow of the fuel in the sac chamber Sk of the injector 20 generated by the pre-injection InjB on the preceding injection InjC and the calculation and usage of the correction coefficient k2 are omitted.

The flow (the turbulence of the flow) of the fuel occurs in the sac chamber Sk of the injector 20 due to the pre-injection InjB (if there is no pre-injection InjB, the intake stroke injection InjA carried out before the preceding injection InjC). When the preceding injection InjC is carried out under a state where the fuel flow remains in the sac chamber Sk, the spray of the injected fuel easily disperses and the penetration force of the spray weakens. As a result, the optimal spare time period changes (elongates). As described below, the third device determines a correction coefficient k5 for eliminating the influence of the strength of the fuel flow in the sac chamber Sk (the strength of the sac chamber fuel flow) on the basis of the interval Tint with respect to the pre-injection InjB.

Figure 16:
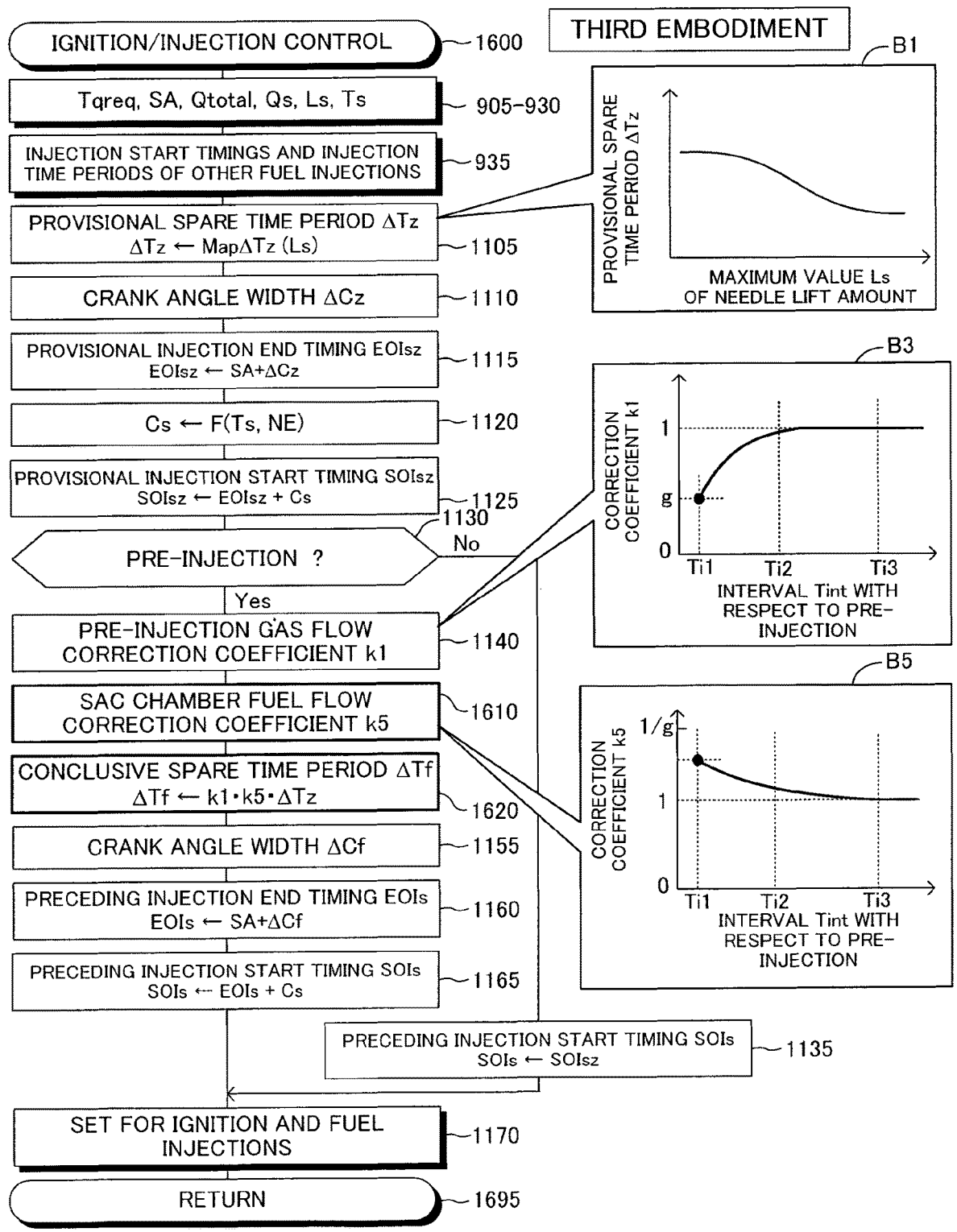
FIG. 16 is a flow chart showing a routine executed by the CPU of a control device (a third device) according to a third embodiment of the invention.

In particular, the CPU of the third device is configured to execute a process of the ignition/injection control routine shown in FIG. 16 by a flow chart in an optional cylinder every the crank angle in the optional cylinder corresponds to the intake top dead center in the optional cylinder. This routine is the same as the routine shown in FIG. 11 except that the step 1145 of FIG. 11 is replaced by the step 1610 and the step 1150 of FIG. 11 is replaced by the step 1620. Therefore, the difference between the routines shown in FIGS. 11 and 16 will be mainly described below. The steps of FIG. 16 for executing the same processes as the processes of the steps of FIG. 11 are indicated by the same reference symbols as the reference symbols of FIG. 11.

When the pre-injection InjB is carried out, the CPU judges "Yes" at the step 1130 and proceeds to the step 1140 where the CPU determines the correction coefficient k1 by applying the interval Tint with respect to the pre-injection InjB to a lookup table Mapk1(Tint) shown in the block B3 of FIG. 16. According to the table Mapk1(Tint), the determined correction coefficient k1 decreases within a range up to 1 as the interval Tint with respect to the pre-injection InjB shortens. When the interval Tint with respect to the pre-injection InjB corresponds to a minimum time period Ti1, the correction coefficient k1 is a value g (0<g<1). Further, when the interval Tint with respect to the pre-injection InjB is larger than or equal to a value Ti2 larger than the value Ti1, the correction coefficient k1 is 1. The correction coefficient k1 is a coefficient for eliminating the influence of the residual gas flow as described above, regarding the step 1140.

Next, the CPU proceeds to the step 1610 where the CPU determines a correction coefficient k5 by applying the interval Tint with respect to the pre-injection InjB to a lookup table Mapk5(Tint) shown in the block B5 of FIG. 16. According to the table Mapk5(Tint), the determined correction coefficient k5 increases within a range larger than or equal to 1 as the interval Tint with respect to the pre-injection InjB shortens.

The correction coefficient k5 is multiplied the provisional spare time period ΔTz to determine the conclusive spare time period ΔTf at the step 1620 described below. Thereby, the spare time period ΔTf elongates as the correction coefficient k5 increases. The reason for elongating the spare time period ΔTf as the interval Tint with respect to the pre-injection InjB, is as follows. That is, the strength of the fuel flow remaining in the sac chamber Sk of the injector 20 increases as the interval Tint with respect to the pre-injection InjB shortens. Thereby, the spray of the fuel injected by the preceding injection InjC easily disperses due to the fuel flow in the sac chamber Sk (the sac chamber fuel flow) and the penetration force of the spray weakens. Therefore, the ignition permissible time period elongates. This is the reason for elongating the spare time period ΔTf as the correction coefficient k5 increases.

When the interval Tint with respect to the pre-injection InjB corresponds to the minimum time Ti1, the correction coefficient k5 is between 1 and the 1/g. Therefore, when the interval Tint with respect to the pre-injection InjB corresponds to the minimum time Ti1, the product of the correction coefficients k1 and k5 is smaller than 1. This is because the influence of the gas flow in the cylinder generated by the pre-injection InjB is larger than the influence of the fuel flow generated in the sac chamber Sk by the pre-injection InjB when the interval Tint with respect to the pre-injection InjB is small.

On the other hand, the correction coefficient k5 is larger than 1 when the interval Tint with respect to the pre-injection InjB corresponds to the value Ti2. The correction coefficient k5 is 1 when the interval Tint with respect to the pre-injection InjB is larger than or equal to the value Ti3 larger than the value Ti2. Therefore, the product of the correction coefficients k1 and k5 changes from the value smaller than 1 to the value larger than 1 as the interval Tint with respect to the pre-injection InjB elongates and then, converges on 1. This is because the fuel flow generated in the sac chamber Sk by the pre-injection InjB remains for longer time than the gas flow generated in the cylinder by the pre-injection InjB.

Next, the CPU proceeds to the step 1620 where the CPU calculates the conclusive spare time period $\Delta Tf$ by multiplying the provisional spare time period $\Delta Tz$ by the correction coefficients k1 and k5 ($\Delta Tf=k1*k5*\Delta Tz$). Then, the CPU executes the processes of the steps 1155 to 1170 in sequence.

As described above, the third device includes a control part (the ECU 40) configured to:

acquire a second parameter having a correlation with the strength of the sac chamber fuel flow which is the fuel flow remaining in the sac chamber Sk at the timing of carrying out the preceding injection InjC (in this case, the second parameter is the interval Tint with respect to the pre-injection InjB); and change the injection end timing EOIs of the preceding injection InjC depending on the acquired second parameter such that the time period (the spare time period $\Delta Tf$) between the injection end timing EOIs of the preceding injection InjC and the ignition timing SA elongates as the strength of the sac chamber fuel flow increases (refer to the steps 1610 and 1620 of FIG. 16, etc.).

Therefore, even when the penetration force of the fuel injected by the preceding injection InjC changes due to the influence of the sac chamber fuel flow and thus, the ignition permissible time period described above changes, the deterioration of the combustion change can be prevented and the combustion efficient can be improved. Preferably, the third device (and the modifications described below) changes the injection end timing EOIb (and the injection start timing SOIb) of the pre-injection InjB by a predetermined crank angle width when the third device changes the injection end timing EOIs (and the injection start timing SOIs) of the preceding injection InjC by a predetermined crank angle width.

First Modification of Third Embodiment

As the fuel injection amount (the pre-injection amount) Qb of the pre-injection InjB increases, the strength of the fuel flow generated in the sac chamber Sk by the pre-injection InjB increases and thus, the strength of the sac chamber fuel flow increases. Accordingly, the first modification elongates the spare time period $\Delta Tf$ as the pre-injection amount Qb increases. In other words, the pre-injection amount Qb is a second parameter having a correlation with the strength of the sac chamber fuel flow.

Figure 17:
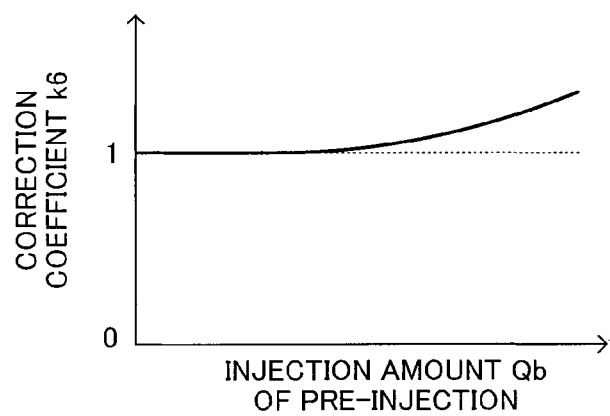
FIG. 17 is a graph showing a relationship between an injection amount of the pre-injection and a correction coefficient.

In particular, the CPU according to the first modification executes a process for acquiring a correction coefficient k6 between the steps 1610 and 1620 of FIG. 16. That is, the CPU acquires the correction coefficient k6 by applying the pre-injection amount Qb to a lookup table Mapk6(Qb) shown in FIG. 17. According to the table Mapk6(Qb), the determined correction coefficient k6 increases within a range larger than or equal to 1 as the pre-injection amount Qb increases.

Further, the CPU according to the first modification calculates the conclusive spare time period $\Delta Tf$ by multiplying the provisional spare time period $\Delta Tz$ by the product of the correction coefficients k1, k5 and k6 at the step 1620 of FIG. 16 ($\Delta Tf=k1*k5*k6*\Delta Tz$). The other features of the first modification are similar to the features of the third device. According to the first modification, even when the strength of the fuel flow generated in the sac chamber Sk changes due to the pre-injection amount Qb and thus, the ignition permissible time period described above changes, the deterioration of the combustion change can be prevented and the combustion efficient can be improved.

Second Modification of Third Embodiment

As the fuel pressure Pf (=Pfb) at the timing of carrying out the pre-injection InjB increases, the strength of the fuel flow generated in the sac chamber Sk by the pre-injection InjB increases and thus, the strength of the sac chamber fuel flow increases. Accordingly, the second modification elongates the spare time period $\Delta Tf$ as the fuel pressure Pf (=Pfb) at the timing of carrying out the pre-injection InjB increases. In other words, the fuel pressure Pf at the timing of carrying out the pre-injection InjB is the second parameter having a correlation with the strength of the sac chamber fuel flow.

Figure 18:
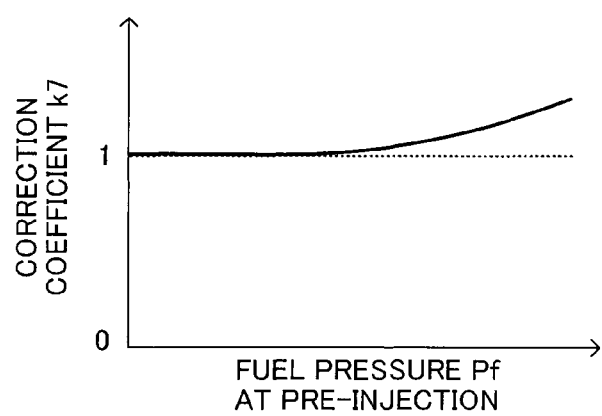
FIG. 18 is a graph showing a relationship between the fuel pressure in the pre-injection and a correction coefficient.

In particular, the CPU according to the second modification executes a process for acquiring the correction coefficient k6 and a correction coefficient k7 between the steps 1610 and 1620 of FIG. 16. The CPU acquires the correction coefficient k6 as described above. Further, the CPU acquires the fuel pressure Pf at the timing of carrying out the pre-injection InjB and acquires the correction coefficient k7 by applying the acquired fuel pressure Pf to a lookup table Mapk7(Pf) shown in FIG. 18. According to the table Mapk7 (Pf), the determined correction coefficient k7 increases within a range larger than or equal to 1 as the fuel pressure Pf at the timing of carrying out the pre-injection InjB increases. For example, the fuel pressure Pf at the timing of carrying out the pre-injection InjB may be a fuel pressure Pf at the injection start timing SOIb of the pre-injection InjB or may be a fuel pressure Pf at a predetermined timing between the injection start and end timings SOIb and EOIb of the pre-injection InjB. The timings of the calculations of the correction coefficient k7 and the conclusive spare time period $\Delta Tf$ are similar to the timings of the calculations of the correction coefficient k3 and the conclusive spare time period $\Delta Tf$ by using the correction coefficient k3 described above, respectively.

Further, the CPU according to the second modification calculates the conclusive spare time period $\Delta Tf$ by multiplying the provisional spare time period $\Delta Tz$ by the product of the correction coefficients k1, k5, k6 and k7 at the step 1620 of FIG. 16 ($\Delta Tf=k1*k5*k6*k7*\Delta Tz$). The other features of the second modification are similar to the features of the first modification of the third device. According to the second modification, even when the strength of the fuel flow generated in the sac chamber Sk changes due to the fuel pressure Pf at the timing of carrying out the pre-injection InjB and thereby, the sac chamber fuel flow changes and thus, the ignition permissible time period described above changes, the deterioration of the combustion change can be prevented and the combustion efficient can be improved.

Third Modification of Third Embodiment

The correction coefficients k5 to k7 are the correction amounts for correcting the spare time period so as to eliminate the influence of the strength of the fuel flow (the sac chamber fuel flow) generated in the sac chamber Sk by the pre-injection InjB and remaining in the sac chamber Sk at the timing of carrying out the preceding injection InjC on the ignition permissible time period (in other words, the spare time period). In other words, the parameters for acquiring these correction coefficients (that is, the interval Tint with respect to the pre-injection InjB, the injection amount Qb of the pre-injection InjB and the fuel pressure Pf (=Pfb) at the timing of carrying out the pre-injection InjB) have correlations with the strength of the sac chamber fuel flow, respectively. Accordingly, the CPU according to the third modification estimates the strength RD of the sac chamber fuel flow on the basis of these parameters and elongates the spare time period $\Delta$Tf as the estimated strength RD increases.

In particular, the CPU according to the third modification executes a process for acquiring a correction coefficient kRD in place of the correction coefficient k5 at the step 1610 of FIG. 16. That is, the CPU first estimates the strength RD of the fuel flow remaining at the timing of carrying out the preceding injection InjC on the basis of the function expression frd described below. "b1" to "b3" are predetermined constants. The function expression frd may be another function expression or a lookup table. The CPU may acquire the strength RD of the fuel flow in consideration of the maximum value Lb of the needle lift amount in the pre-injection InjB or may estimate the strength RD of the fuel flow on the basis of one or more of parameters such as the interval Tint with respect to the pre-injection InjB, the injection amount Qb of the pre-injection InjB, the fuel pressure Pf (=Pfb) at the timing of carrying out the pre-injection InjB and the maximum value Lb of the lift amount in the pre-injection InjB. Alternatively, the CPU may acquire the strength RD of the fuel flow on the basis of two or more of the parameters such as the interval Tint with respect to the pre-injection InjB, the injection amount Qb of the pre-injection InjB and the fuel pressure Pf at the timing of carrying out the pre-injection InjB. The strength RD of the sac chamber fuel flow is the second parameter having a correlation with the strength of the sac chamber fuel flow.

$$RD = frd(\text{Tint}, Qb, Pfb)$$
$$= b1/\text{Tint} + b2 * Qb + b3 * Pfb$$

Figure 19:
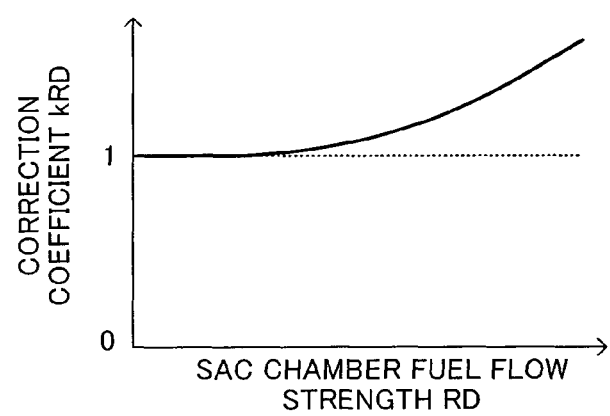
FIG. 19 is a graph showing a relationship between a strength of a sac chamber fuel flow and a correction coefficient.

Next, the CPU acquires the correction coefficient kRD by applying the strength RD of the fuel flow to a lookup table MapkRD(RD) shown in FIG. 19. According to the table MapkRD(RD), the determined correction coefficient kRD increases within a range larger than or equal to 1 as the strength RD of the sac chamber fuel flow increases.

Further, the CPU calculates the conclusive spare time period $\Delta$Tf by multiplying the provisional spare time period $\Delta$Tz by the product of the correction coefficients k1 and kRD at the step 1620 of FIG. 16 ($\Delta$Tf=k1*kRD*$\Delta$Tz). The other features of the third modification are similar to the features of the third device. According to the third modification, even when the strength RD of the sac chamber fuel flow changes and thus, the ignition permissible time period described above changes, the deterioration of the combustion change can be prevented and the combustion efficient can be improved.

The CPU may estimate the strength RD of the sac chamber fuel flow by the other method described below.

The CPU acquires the fuel pressure Pf in the sac chamber Sk on the basis of the output value of a pressure sensor including a piezo element provided in the sac chamber Sk and estimates the strength RD of the sac chamber fuel flow on the basis of the change of the acquired fuel pressure Pf (for example, the average value of the amplitude of the change of the fuel pressure Pf for a predetermined time period).

The CPU acquires the fuel pressure Pf in the fuel passage FP on the basis of the output value of a pressure sensor including a piezo element provided upstream of the seat part Sh in the interior of the injector 20 and estimates the strength RD of the sac chamber fuel flow on the basis of the change of the acquired fuel pressure Pf (for example, the average value of the amplitude of the change of the fuel pressure Pf for a predetermined time period).

As described above, according to each of the embodiments and the modifications of the invention, the spare time period can be set appropriately (the ignition can be carried out immediately before the end of the ignition permissible time period) and thus, the excessive increasing of the combustion change can be prevented and the combustion efficient can be improved. The invention is not limited to the embodiments and the modifications described above and various modifications can be employed within the scope of the invention.

For example, the present control device may be configured to acquire the conclusive spare time period $\Delta$Tf by multiplying the provisional spare time period $\Delta$Tz by one or more of the correction coefficients k1 to k4.

Similarily, the present control device may be configured to acquire the conclusive spare time period $\Delta$Tf by multiplying the provisional spare time period $\Delta$Tz by one or more of the correction coefficients k5 to k7.

Further, the present control device may be configured to acquire the conclusive spare time period $\Delta$Tf by multiplying the provisional spare time period $\Delta$Tz by the correction coefficient kCF and one or more of the correction coefficients k5 to k7.

Furthermore, the present control device may be configured to acquire the conclusive spare time period $\Delta$Tf by multiplying the provisional spare time period $\Delta$Tz by the correction coefficient kRD and one or more of the correction coefficients k1 to k4.

In addition, the present control device may be configured to acquire the conclusive spare time period $\Delta$Tf by multiplying the provisional spare time period $\Delta$Tf by the correction coefficients kCF and kRD.

Further, the present control device may be configured to:
acquire at least one of the time period between the injection end timing EOIb of the pre-injection InjB and the injection start timing SOIs of the preceding injection InjC (the interval Tint with respect to the pre-injection InjB), the amount (Qb) of the fuel injected by the pre-injection InjB and the fuel pressure (Pf=Pfb) at the timing of carrying out the pre-injection InjB as a common parameter for the first and second parameters;
acquire a correction amount for correcting the influence of the residual gas flow and the sac chamber fuel flow on the penetration force of the fuel injected by the preceding injection InjC on the basis of the common parameter described above; and
correct the spare time period $\Delta$Tf (the provisional spare time period $\Delta$Tz) by using the correction amount.

In this case, for example, when the interval Tint with respect to the pre-injection InjB is used as the common parameter described above, a correction coefficient corresponding to the product of the correction coefficients k1 and k5 may be acquired on the basis of the interval Tint with respect to the pre-injection InjB and the spare time period $\Delta$Tf may be corrected by the acquired correction coefficient.

Further, the second device, etc. acquires the conclusive spare time period $\Delta Tf$ by multiplying the provisional spare time period $\Delta Tz$ by the correction coefficients selected from the correction coefficients k1 to k4. However, the second device and the modifications thereof may acquire correction time periods T1 to T4 corresponding to the correction coefficients k1 to k4, respectively and acquire the conclusive spare time period $\Delta Tf$ by adding one or more of the correction time periods T1 to T4 to the provisional spare time period $\Delta Tz$. In addition, the third modification of the second device acquires the conclusive spare time period $\Delta Tf$ by multiplying the provisional spare time period $\Delta Tz$ by the correction coefficient kCF. However, the third modification of the second device may acquire a correction time period TCF corresponding to the correction coefficient kCF and acquire the conclusive spare time period $\Delta Tf$ by adding the acquired correction time period TCF to the provisional spare time period $\Delta Tz$. In this case, when the value of the optional correction coefficient is smaller than 1, the correction time period corresponding to the correction coefficient is a negative value.

Similarly, the third device, etc. acquires the conclusive spare time period $\Delta Tf$ by multiplying the provisional spare time period $\Delta Tz$ by one or more of the correction coefficients k5 to k7. However, the third device and the modifications thereof may acquire correction time periods T5 to T7 corresponding to the correction coefficients k5 to k7, respectively and acquire the conclusive spare time period $\Delta Tf$ by adding one or more of these correction time periods T5 to T7 to the provisional spare time period $\Delta Tz$. In addition, the third modification of the third device acquires the conclusive spare time period $\Delta Tf$ by multiplying the provisional spare time period $\Delta Tz$ by the correction coefficient kRD. However, the third modification of the third device may acquire a correction time period TRD corresponding to the correction coefficient kRD and then, acquire the conclusive spare time period $\Delta Tf$ by adding the correction time period TRD to the provisional spare time period $\Delta Tz$. When the value of the optional correction coefficient is larger than 1, the correction time period corresponding to the correction coefficient is a positive value.

In addition, the pre-injection InjB may be realized by the full lift injection. Further, the intake stroke injection InjA may be realized by two injections including the fuel injection carried out in the first half of the intake stroke (for example, 60 to 80 degree crank angle after the intake top dead center) and the fuel injection carried out in the latter half of the intake stroke (for example, 100 to 120 degree crank angle after the intake top dead center). That is, the manner of the fuel injection in one cycle is not limited to the manner according to the embodiments described above. Furthermore, the ignition timing SA may be determined on the basis of the other paramers expressing the operation state of the engine 10 such as the cooling water temperature THW, the intake air temperature, the intake air amount Ga and the throttle valve opening degree TA.

Further, the injector 20 is an injector in which the injection holes 21a are directly closed by the tip end part of the needle valve 22. However, the injector 20 may be an injector in which the injection holes 21a are formed to always communicate with the relatively large sac chamber and the needle valve 22 moves to open and close the connection part between the sac chamber and the fuel passage FP (an inward lifting valve). In addition, in the embodiments described above, only the injection end timing EOIs of the preceding injection InjC is changed when the spare time period ($\Delta T$ or $\Delta Tf$) is changed. However, in addition to the change of the injection end timing EOIs of the preceding injection InjC, the ignition timing SA may be slightly changed. Further, in the embodiments and the modifications thereof described above, the spare time period is determined and changed. However, the crank angle width (the spare crank angle width) between the injection end timing EOIs of the preceding injection InjC and the ignition timing SA may be managed and changed to change the spare time period.

The invention claimed is:

1. A control device of a cylinder-injection internal combustion engine, comprising:
 a spark plug provided with a spark generation part;
 an injector provided with a movable valve body and an injection hole, the injector configured to inject a fuel into a cylinder of the internal combustion engine via the injection hole such that at least a portion of the injected fuel contacts the spark generation part directly; and
 a control unit configured to execute a first fuel injection process for lifting the movable valve body of the injector to inject the fuel into the cylinder, and an ignition process for causing the spark generation part to generate a spark in an engine cycle,
 wherein the control unit is programmed to:
  set a target ignition timing for which the spark generation part is to be caused to generate the spark based on an operation state of the internal combustion engine;
  set a first target fuel injection amount for which the injector is to inject the fuel into the cylinder based on the operation state of the internal combustion engine;
  set a first target lift amount for which the movable valve body of the injector is to be lifted based on the first target fuel injection amount;
  set a first target injection end timing for which the movable valve body of the injector is to be closed based on the first target lift amount, such that the first target injection end timing is advanced when the first target lift amount is relatively small, as compared to when the first target lift amount is relatively large;
  set a first target injection start timing for which the movable valve body of the injector is to be lifted based on the first target injection end timing, the first target lift amount, and the first target fuel injection amount;
  start the first fuel injection process at the first target injection start timing to thereby lift the movable valve body of the injector to the first target lift amount;
  end the first fuel injection process at the first target injection end timing to thereby move the movable valve body of the injector to close the injection hole; and
  cause the spark generation part to generate the spark at the target ignition timing.

2. The control device of claim 1,
 wherein the control unit is programmed to:
  acquire a fuel pressure of the fuel injected from the injection hole; and
  when executing the first fuel injection process, advance the first target injection end timing when the fuel pressure is relatively low, as compared to when the fuel pressure is relatively high.

3. The control device of claim 1,
 wherein the control unit is further configured to execute a fuel injection pre-process before executing the first fuel injection process, wherein the control unit is programmed to:
set a pre-process target fuel injection amount for which the injector is to inject the fuel into the cylinder based on the operation state of the internal combustion engine;
set a pre-process target lift amount for which the movable valve body of the injector is to be lifted based on the pre-process target fuel injection amount;
set a pre-process target injection start timing for starting the fuel injection pre-process to thereby lift the movable valve body of the injector to the pre-process target lift amount, and a pre-process target injection end timing for ending the fuel injection pre-process to thereby move the movable valve body of the injector to close the injection hole;
acquire at least one first parameter representing a strength of a gas flow in the cylinder; and
advance the first target injection end timing based on the at least one first parameter when the at least one first parameter representing the strength of the gas flow in the cylinder is relatively small, as compared to when the at least one first parameter representing the strength of the gas flow in the cylinder is relatively large.

4. The control device of claim 3,
wherein the at least one first parameter includes an interval between the pre-process target injection end timing and the first target injection start timing, such that a relatively short interval represents a relatively large strength of the gas flow in the cylinder, and a relatively long interval represents a relatively small strength of the gas flow in the cylinder.

5. The control device of claim 3,
wherein the at least one first parameter is the pre-process target fuel injection amount, such that a relatively large pre-process target fuel injection amount represents a relatively large strength of the gas flow in the cylinder, and a relatively small pre-process target fuel injection amount represents a relatively small strength of the gas flow in the cylinder.

6. The control device of claim 3,
wherein the at least one first parameter is a fuel pressure of the fuel injected from the injection hole when executing the fuel injection pre-process, such that a relatively high fuel pressure represents a relatively large strength of the gas flow in the cylinder, and a relatively low fuel pressure represents a relatively small strength of the gas flow in the cylinder.

7. The control device of claim 3,
wherein the at least one first parameter includes two or more of an interval between the pre-process target injection end timing and the first target injection start timing, the pre-process target fuel injection amount, and a fuel pressure of the fuel injected from the injection hole when executing the fuel injection pre-process,
wherein a relatively short interval represents a relatively large strength of the gas flow in the cylinder, and a relatively long interval represents a relatively small strength of the gas flow in the cylinder,
wherein a relatively large pre-process target fuel injection amount represents a relatively large strength of the gas flow in the cylinder, and a relatively small pre-process target fuel injection amount represents a relatively small strength of the gas flow in the cylinder, and
wherein a relatively high fuel pressure represents a relatively large strength of the gas flow in the cylinder, and a relatively low fuel pressure represents a relatively small strength of the gas flow in the cylinder.

8. The control device of claim 1,
wherein the injector includes a sac chamber at a tip end of the injector,
wherein the sac chamber is in fluidic communication with the injection hole when the movable valve body is lifted, and
wherein the control unit is programmed to:
acquire at least one parameter representing a strength of a fuel flow in the sac chamber; and
when executing the first fuel injection process, advance the first target injection end timing based on the at least one parameter when the at least one parameter representing the strength of the fuel flow in the sac chamber is relatively large, as compared to when the at least one parameter representing the strength of the fuel flow in the sac chamber is relatively small.

9. The control device of claim 8,
wherein the control unit is further configured to execute a fuel injection pre-process before executing the first fuel injection process,
wherein the control unit is programmed to:
set a pre-process target fuel injection amount for which the injector is to inject the fuel into the cylinder based on the operation state of the internal combustion engine;
set a pre-process target lift amount for which the movable valve body of the injector is to be lifted based on the pre-process target fuel injection amount;
set a pre-process target injection start timing for starting the fuel injection pre-process to thereby lift the movable valve body of the injector to the pre-process target lift amount, and a pre-process target injection end timing for ending the fuel injection pre-process to thereby move the movable valve body of the injector to close the injection hole;
wherein the at least one parameter includes an interval between the pre-process target injection end timing and the first target injection start timing, and
wherein a relatively short interval represents a relatively large strength of the fuel flow in the sac chamber, and a relatively long interval represents a relatively small strength of the fuel flow in the sac chamber.

10. The control device of claim 8,
wherein the control unit is further configured to execute a fuel injection pre-process before executing the first fuel injection process,
wherein the control unit is programmed to:
set a pre-process target fuel injection amount for which the injector is to inject the fuel into the cylinder based on the operation state of the internal combustion engine;
set a pre-process target lift amount for which the movable valve body of the injector is to be lifted based on the pre-process target fuel injection amount;
set a pre-process target injection start timing for starting the fuel injection pre-process to thereby lift the movable valve body of the injector to the pre-process target lift amount, and a pre-process target injection end timing for ending the fuel injection pre-process to thereby move the movable valve body of the injector to close the injection hole;

wherein the at least one parameter includes the pre-process target fuel injection amount, and
wherein a relatively large pre-process target fuel injection amount represents a relatively large strength of the fuel flow in the sac chamber, and a relatively small pre-process target fuel injection amount represents a relatively small strength of the fuel flow in the sac chamber.

11. The control device of claim 8,
wherein the control unit is further configured to execute a fuel injection pre-process before executing the first fuel injection process,
wherein the control unit is programmed to:
set a pre-process target fuel injection amount for which the injector is to inject the fuel into the cylinder based on the operation state of the internal combustion engine;
set a pre-process target lift amount for which the movable valve body of the injector is to be lifted based on the pre-process target fuel injection amount;
set a pre-process target injection start timing for starting the fuel injection pre-process to thereby lift the movable valve body of the injector to the pre-process target lift amount, and a pre-process target injection end timing for ending the fuel injection pre-process to thereby move the movable valve body of the injector to close the injection hole;
wherein the at least one parameter includes a fuel pressure of the fuel injected from the injection hole when executing the fuel injection pre-process, such that a relatively high fuel pressure represents a relatively large strength of the fuel flow in the sac chamber, and a relatively low fuel pressure represents a relatively small strength of the fuel flow in the sac chamber.

12. The control device of claim 8,
wherein the control unit is further configured to execute a fuel injection pre-process before executing the first fuel injection process,
wherein the control unit is programmed to:
set a pre-process target fuel injection amount for which the injector is to inject the fuel into the cylinder based on the operation state of the internal combustion engine;
set a pre-process target lift amount for which the movable valve body of the injector is to be lifted based on the pre-process target fuel injection amount;
set a pre-process target injection start timing for starting the fuel injection pre-process to thereby lift the movable valve body of the injector to the pre-process target lift amount, and a pre-process target injection end timing for ending the fuel injection pre-process to thereby move the movable valve body of the injector to close the injection hole;
wherein the at least one parameter includes two or more of an interval between the pre-process target injection end timing and the first target injection start timing, the pre-process target fuel injection amount, and a fuel pressure of the fuel injected from the injection hole when executing the fuel injection pre-process,
wherein a relatively short interval represents a relatively large strength of the fuel flow in the sac chamber, and a relatively long interval represents a relatively small strength of the fuel flow in the sac chamber,
wherein a relatively large pre-process target fuel injection amount represents a relatively large strength of the fuel flow in the sac chamber, and a relatively small pre-process target fuel injection amount represents a relatively small strength of the fuel flow in the sac chamber, and
wherein a relatively high fuel pressure represents a relatively large strength of the fuel flow in the sac chamber, and a relatively low fuel pressure represents a relatively small strength of the fuel flow in the sac chamber.

13. The control device of claim 3,
wherein the injector includes a sac chamber at a tip end of the injector,
wherein the sac chamber is in fluidic communication with the injection hole when the movable valve body is lifted, and
wherein the control unit is programmed to:
acquire at least one second parameter representing a strength of a fuel flow in the sac chamber; and
advance the first target injection end timing based on the at least one second parameter in addition to the at least one first parameter when the at least one second parameter representing the strength of the fuel flow in the sac chamber is relatively large, as compared to when the at least one second parameter representing the strength of the fuel flow in the sac chamber is relatively small.

14. The control device of claim 13,
wherein the at least one second parameter includes an interval between the pre-process target injection end timing and the first target injection start timing, and
wherein a relatively short interval represents a relatively large strength of the fuel flow in the sac chamber, and a relatively long interval represents a relatively small strength of the fuel flow in the sac chamber.

15. The control device of claim 13,
wherein the at least one second parameter includes the pre-process target fuel injection amount, and
wherein a relatively large pre-process target fuel injection amount represents a relatively large strength of the fuel flow in the sac chamber, and a relatively small pre-process target fuel injection amount represents a relatively small strength of the fuel flow in the sac chamber.

16. The control device of claim 13,
wherein the at least one second parameter includes a fuel pressure of the fuel injected from the injection hole when executing the fuel injection pre-process, and
wherein a relatively high fuel pressure represents a relatively large strength of the fuel flow in the sac chamber, and a relatively low fuel pressure represents a relatively small strength of the fuel flow in the sac chamber.

17. The control device of claim 13,
wherein the at least one second parameter includes two or more of an interval between the pre-process target injection end timing and the first target injection start timing, the pre-process target fuel injection amount, and a fuel pressure of the fuel injected from the injection hole when executing the fuel injection pre-process,
wherein a relatively short interval represents a relatively large strength of the fuel flow in the sac chamber, and a relatively long interval represents a relatively small strength of the fuel flow in the sac chamber,
wherein a relatively large pre-process target fuel injection amount represents a relatively large strength of the fuel flow in the sac chamber, and a relatively small pre-process target fuel injection amount represents a relatively small strength of the fuel flow in the sac chamber, and wherein a relatively high fuel pressure represents a relatively large strength of the fuel flow in the sac chamber, and a relatively low fuel pressure represents a relatively small strength of the fuel flow in the sac chamber.

\* \* \* \* \*